United States Patent
Hickman et al.

(10) Patent No.: US 12,522,977 B2
(45) Date of Patent: *Jan. 13, 2026

(54) AUTONOMOUS DEVICES, SYSTEMS, AND METHODS FOR PACKING UNFOLDED LAUNDRY ARTICLES

(71) Applicant: Monotony.ai, Inc., Watertown, MA (US)

(72) Inventors: Madeline R. Hickman, Arlington, MA (US); Wilson J. Mefford, Watertown, MA (US); Jesse Sielaff, Norfolk, MA (US); Hannah S. Siemens, Jamaica Plain, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/787,002

(22) Filed: Jul. 29, 2024

(65) Prior Publication Data

US 2024/0384460 A1    Nov. 21, 2024

Related U.S. Application Data

(63) Continuation of application No. 18/172,481, filed on Feb. 22, 2023, now Pat. No. 12,077,903.

(Continued)

(51) Int. Cl.
| | |
|---|---|
| *D06F 93/00* | (2006.01) |
| *B65B 5/06* | (2006.01) |

(Continued)

(52) U.S. Cl.
CPC .............. *D06F 95/00* (2013.01); *B65B 5/06* (2013.01); *B65B 25/20* (2013.01); *B65B 43/54* (2013.01);

(Continued)

(58) Field of Classification Search
CPC ......... D06F 95/00; D06F 93/00; B65B 57/14; B65B 5/06; B65B 25/20
See application file for complete search history.

(56) References Cited

U.S. PATENT DOCUMENTS

| | | |
|---|---|---|
| 991,381 A | 5/1911 | Simmers |
| 1,947,398 A | 2/1934 | Martin |
| (Continued) | | |

FOREIGN PATENT DOCUMENTS

WO    8704242 A1    7/1987

OTHER PUBLICATIONS

Historystones , "How to build a Vibrating table on a budget", YouTube Video accessed Dec. 7, 2022; Retrieved from https://www.youtube.com/watch?v=GWImU7CCU8g, (1 page).

(Continued)

*Primary Examiner* — Andrew M Tecco
(74) *Attorney, Agent, or Firm* — Myers Bigel, P.A.

(57) ABSTRACT

Devices, systems, and methods for autonomously packing unfolded laundry articles into a container are described. The system includes a container configured to receive the laundry articles, a movable surface for receiving the container, and at least one drive motor for imparting motion to the laundry articles in the container, including at least one of a shaking, twisting, vibrating, oscillating, shushling, and tilting. At least one sensor is configured to detect two or more container fill heights. A controller in communication with the at least one drive motor and the at least one sensor is configured to instruct the at least one drive motor to rotate at least one of a driven conveyor, driven pusher, and driven rollers and the container disposed thereon rapidly back and forth repeatedly until a maximum height variation in the two or more container fill heights falls within a threshold range.

13 Claims, 18 Drawing Sheets

Related U.S. Application Data

(60) Provisional application No. 63/312,614, filed on Feb. 22, 2022.

(51) Int. Cl.
    *B65B 25/20* (2006.01)
    *B65B 43/54* (2006.01)
    *B65B 57/14* (2006.01)
    *B65G 69/04* (2006.01)
    *D06F 95/00* (2006.01)

(52) U.S. Cl.
    CPC .......... *B65B 57/14* (2013.01); *B65G 69/0425* (2013.01); *B65G 69/045* (2013.01); *D06F 93/00* (2013.01); *B65G 2203/0233* (2013.01); *B65G 2814/0258* (2013.01); *B65G 2814/0276* (2013.01)

(56) References Cited

U.S. PATENT DOCUMENTS

| | | | |
|---|---|---|---|
| 2,649,165 A | 8/1953 | Albert | |
| 2,862,385 A | 12/1958 | Woods | |
| 3,224,255 A | 12/1965 | Woods | |
| 3,357,686 A | 12/1967 | Wuyckhuyse | |
| 3,451,658 A | 6/1969 | Matson | |
| 3,974,627 A * | 8/1976 | Groschopp | B65B 39/02 53/261 |
| 4,036,365 A * | 7/1977 | Rosenfeld | B07C 5/3412 209/3.3 |
| 4,483,621 A | 11/1984 | Kreiskorte | |
| 6,085,914 A * | 7/2000 | Tobaccowala | B07C 7/005 209/702 |
| 6,655,890 B1 * | 12/2003 | Weir | B65G 47/525 414/13 |
| 7,540,126 B2 * | 6/2009 | Abbott | B65B 53/02 53/529 |
| 9,908,152 B2 * | 3/2018 | Sielermann | B07C 5/34 |
| 9,920,470 B2 * | 3/2018 | Tautz | D06F 93/00 |

OTHER PUBLICATIONS

Humboldt Filling Machines, "Vibration Table", Product Information Sheet—Accessed Dec. 6, 2022; Retrieved from https://humboldtfillingmachines.com/products/vibration-table?variant=42240312017131&currency=USD&utm_medium=product_sync&utm_source=go%E2%80%A6, (4 pages).

Pechoo, "DIY Vibrating Table with Washing Machine Motor", YouTube Video accessed Dec. 7, 2022; Retrieved from: https://www.youtube.com/watch?v=oe2u4otDsFM, (1 page).

Pitsco Education, LLC, "EZ Shake Table (W42498)", Product information sheet—Accessed no later than Dec. 7, 2022; Retrieved from: https://www.pitsco.com/EZ-Shake-Table, (3 pages).

* cited by examiner

AUTONOMOUS DEVICES, SYSTEMS, AND METHODS FOR PACKING UNFOLDED LAUNDRY ARTICLES

CROSS-REFERENCE TO RELATED APPLICATIONS

This application is a continuation of U.S. patent application Ser. No. 18/172,481 filed Feb. 22, 2023 titled, "Autonomous Devices, Systems, and Methods for Packing Unfolded Laundry Articles," which claims priority under 35 U.S.C. § 119(e) to U.S. Provisional Patent Application Ser. No. 63/312,614 filed Feb. 22, 2022, titled "Autonomous Devices, Systems, and Methods for Packing Unfolded Laundry Articles," the entirety of which applications are hereby incorporated by reference.

BACKGROUND

The present disclosure is directed to robotic laundry devices, systems, and methods.

Automating and outsourcing mundane, time-consuming household chores to robotic devices is increasingly common. Time-saving home robots include, for example, floor vacuuming and floor washing robots. Outsourcing responsibilities include, for example, engaging grocery shopping and delivery, and manually operated and human-operator dependent laundry washing and dry-cleaning pick up and return services.

Many homes are appointed with a dedicated washer and dryer for family use. Domestic washers and dryers are increasingly sophisticated and include IoT connectivity features and push notifications for alerting users about cycle progress and energy and resource usage. These technologically advanced machines, however, require human interaction and cannot eliminate the time required for processing loads of laundry in the home. Although more modern, "high efficiency" machines are equipped with sensors for metering water usage and dryer temperatures, the efficiency gains are capped by the constraints of sequentially processing single loads of laundry. Grey water is output to the city water and sewer system for mitigation with each load of laundry processed. Energy is consumed with each load of laundry washed and dried.

Households can outsource laundry chores to laundromat facilities for a fee in exchange for time. Laundromats offering residential mixed load laundering services, however, require human interaction for intake and sorting of dirty laundry, transferring loads from washer to dryer, and then manually folding and repacking clean laundry. These are costly processes as measured in time, energy consumption, water consumption, and wastewater output, and they rely on human intervention to keep the process running at every transition and throughout several process steps. This invites delays at every stage. Because these processes are human-dependent and inefficient, the costs are passed along to the customers outsourcing their laundry for cleaning. Human-reliant laundering services also require that employees touch the belongings of the customer, potentially exposing the employee to contaminants in the dirty laundry and potentially exposing the clean laundry to transferable pathogens, dust, hair, and other debris emanating from a laundromat employee. In addition to potentially introducing undesirable contact contamination from the employees processing the loads of laundry, a privacy barrier is breached. Outsourcing household laundry to a laundromat involves employees interacting with customers' personal belongings including bodily worn garments.

Industrial laundry services exist for handling uniform business-related items, such as hospital bed sheets, medical scrubs, and hotel towels. Such industrial machines are tailor-made to accept one type of laundry item of one size or style. For example, unique folding machines exist to accept washed flat sheets, fitted sheets, hotel towels, and hotel bathrobes. These machines require human operators to load the washed article into its dedicated machine, which is sized and designed to fold that one type and size of article. This type of process line relies on a human operator for properly aligning and loading the clean article into the machine, which could introduce bodily contaminants, bacteria, and viral matter into the clean articles. Like laundromat services, these industrial services rely on human intervention and potentially introduce bio-contaminants into clean loads of laundry. Because these services are only profitable by processing large volumes of like items, these industrial processors are generally subscription-based services for large clients like hotels and hospitals producing standard-size, repeat laundry articles and are not available to consumers at an individual household level. Additionally, these services are configured to combine laundry from more than one source and are not configured to isolate and process separate loads for individual households.

Autonomous robotic devices are provided to process loads of household laundry. Such devices eliminate human contact with deformable laundry articles and autonomously process batches of disparate article types and sizes. As such, the devices need to be designed to be efficient and reliable for replacing the common, human-dependent chore of laundry.

SUMMARY

In one example, an autonomously operated system for packing folded laundry articles includes a container configured to receive a plurality of unfolded laundry articles dropped from a height above into the container, a movable surface configured to receive the container thereon, the movable surface including at least one of a driven conveyor, driven pusher, and driven rollers, and at least one actuator configured to impart motion to the received plurality of unfolded laundry articles disposed in the box. The at least one actuator includes at least one of a drive motor configured rotate the at least one of the driven conveyor, driven pusher, and driven rollers. The system includes at least one plunger to compress the plurality of unfolded laundry articles within the container, the at least one plunger being operably connected to a linear actuator, and at least one sensor disposed proximate the movable surface. The at least one sensor is configured to detect one or more container fill heights along a top surface of the plurality of unfolded laundry articles disposed within the container. The autonomously operated system includes a controller in operable communication with the at least one actuator the linear actuator of the at least one plunger, and the at least one sensor. The controller is configured to: instruct the at least one actuator to move the container back and forth two or more times, instruct the at least one plunger to lower and compress the plurality of unfolded laundry articles, receive an output signal from the at least one sensor indicative of one or more container fill heights along the top surface of the plurality of unfolded laundry articles, analyze the received output signal to determine whether one or more container fill heights detected along the top surface of the plurality of unfolded laundry articles include a maximum height variation within a threshold range, and based on an analysis indicative of the maximum height variation being within the threshold range, instruct the drive motor of the movable surface to transit the container to a packing station for receiving one or more folded laundry articles atop the compressed plurality of unfolded laundry articles.

Implementations of the system may include one or more of the following features.

In examples, the container receives the plurality of unfolded laundry articles from an overhead bin tipper and funnel. In examples, the system further includes a conveyor configured to transit a bin containing the plurality of unfolded laundry articles from an autonomous washing and drying machine to the bin tipper.

In examples, the unfolded laundry articles each measure no more than 15 cm in a shortest dimension and each weigh no more than 0.25 kg.

In examples, the unfolded laundry articles include articles identified by a separating and sorting robot as being at least one of small and unable to be folded. The articles unable to be folded can include articles including a detected characteristic including at least one of fabric stiffness, lacking symmetry, and being of an identified type of article not requiring folding including at least one of undergarments and socks.

In examples, the unfolded laundry articles are unfolded household laundry articles of more than one article type and size. In examples, the unfolded household laundry articles include at least one of socks, undergarments, gloves, hats, swimwear, and baby clothes.

In examples, the drive motor is configured to rotate the at least one of the driven conveyor, driven pusher, and driven rollers and the box disposed thereon rapidly back and forth repeatedly until the maximum height variation falls within the threshold range, as detected by the at least one sensor. The threshold range can include a range of between about 0 cm to 10 cm.

In examples, the system further includes selectively extended and retracted barrier on either end of the movable surface, and the barriers provide a hard stop for the box moving back and forth on the movable surface. In examples, an actuator of the barriers are in operative communication with the controller.

In examples, the at least one actuator is configured to drive at least one motor for at least one of rotating, spinning, tilting, shaking, vibrating, oscillating, and shushling of the movable surface.

In examples, the at least one actuator of the system further includes at least one of a motor driven cam and follower assembly configured to raise and lower one end of the container, wherein that at least one motor driven cam and follower assembly includes two assemblies, one disposed beneath either end of the container to alternate raising and lowering each end in succession, a rotational motor configured to spin the movable surface about a vertical axis, an oscillation motor configured to oscillate the movable surface, a shake table configure to shake the container, and a vibrational motor configured to vibrate the movable surface. In examples, two or more of the at least one actuator are synchronously actuated for shushling the container.

In examples, the plunger is further configured to impart oscillation to the received plurality of unfolded articles.

In examples, the system can further include an overhead distributor configured to lower into the box and rake the received plurality of unfolded articles flat prior to the plunger compressing the articles.

In examples, the at least one sensor includes an optical sensor.

In examples, the at least one sensor includes at least one of a 3-D camera, an IR sensor, a 2-D camera, LIDAR, LADAR, a sonar proximity sensor, an ultrasonic ranging sensor, a radar sensor, a laser measuring device, and a pair of stereo depth cameras.

In examples, the at least one sensor includes at least one load cell disposed on the one or more plungers, the at least one load cell being configured to detect when the plunger has reached a threshold compression force indicative of the plurality of unfolded laundry articles being compressed, determine a height of the plurality of unfolded laundry articles disposed within the box relative to a known height of a box bottom surface, and output a signal indicative of the height of the plurality of unfolded laundry articles to the controller.

In examples, the at least one sensor includes an absolute position sensor disposed on the at least one plunger driven by a motor and an additional sensor disposed on or adjacent to an actuated piston extending the plunger, the absolute position sensor and additional sensor being configured to detect a distance traveled by the plunger to a final compression height of the plurality of unfolded laundry articles. The position sensor can include a magnetic encoder disposed on the drive motor of the plunger. In examples, the container has a known height from a container bottom to a container opening rim, wherein the at least one plunger is disposed at a fixed height above the container, and the distance traveled by the plunger past the rim is determinative of the surface height of the plurality of unfolded laundry articles.

In examples, a plunger compression force includes a range of between about 0.25 lbf to 10 lbf.

In examples, the at least one plunger includes two side-by-side plungers configured to substantially cover the top surface of the plurality of unfolded laundry articles disposed in the container.

In one example, a method of autonomously redistributing a plurality of deformable laundry articles received in a box includes instructing at least one actuator in communication with a controller to at least one of shake, tilt, oscillate, vibrate, shushle, and spin the box. The at least one actuator can be disposed on or adjacent a movable surface configured to receive the box thereon. The method includes instructing at least one plunger disposed above the box configured to extend and compress the plurality of deformable laundry articles. The at least one plunger can be operably connected to a linear actuator in communication with the controller. The method includes receiving, by the controller, one or more an output signals from at least one sensor disposed proximate the movable surface, the at least one sensor being configured to detect box fill heights along a top surface of the plurality of deformable laundry articles. The method includes analyzing, by the controller, the received one or more output signals to determine whether the box fill heights detected along the top surface of the plurality of deformable laundry articles include a maximum height variation within a threshold range. The method includes instructing, based on an analysis indicative of the maximum height variation being within the threshold range, a drive motor of the movable surface to transit the container 7800 to a packing station (e.g., below the refillable cartridge) for receiving one or more folded laundry articles atop the compressed plurality of unfolded laundry articles 7300a. In implementations, the movable surface includes at least one of a driven conveyor, a driven pusher, and driven rollers, and the drive motor being in operable communication with the controller.

Implementations of the method may include one or more of the following features.

In examples, the method further includes based on an analysis of the maximum height variation being larger than the threshold range, iteratively, instructing the at least one actuator to at least one of shake, tilt, vibrate, oscillate, shushle and spin the box, instructing the at least one plunger disposed above the box to compress the plurality of deformable laundry articles, receiving an output signal from the at least one sensor disposed proximate the movable surface, and analyzing the received output signal to determine whether the box fill heights detected along the top surface of the plurality of deformable laundry articles include a maximum height variation within a threshold range.

In examples, the at least one actuator includes at least one of the drive motor configured rotate at least one of a driven conveyor, driven pusher, and driven rollers of the movable surface, a drive motor configured to rotate at least one a cam and follower assembly disposed at one or both ends of the box, a rotational motor configured to spin the movable surface about a vertical axis, a vibration motor, and an oscillation motor.

In examples, the method is configured to be executed autonomously by one or more controllers, and the one or more controllers are configured to be in operative communication with the one or more processors, sensors, and drives of the system. In examples, the one or more controllers are configured to communicate with each device of the system over a communication network via at least one of wired and wireless communication protocols.

DETAILED DESCRIPTION

Figure 1:
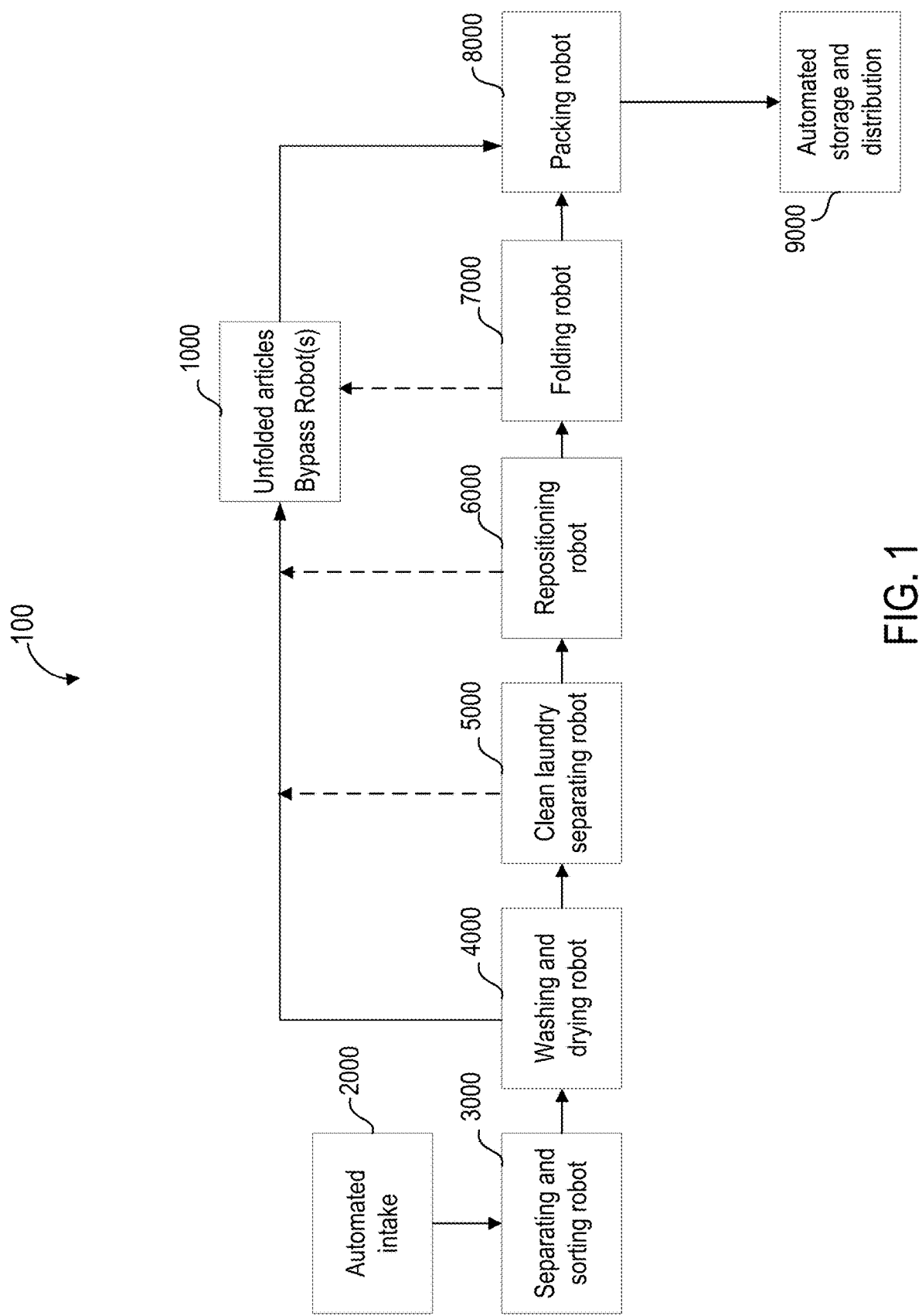
FIG. 1 depicts a schematic of an example autonomous robotic laundry process line.

This disclosure relates to autonomous robotic devices, systems, and methods for packing folded and unfolded residential laundry articles into a container (e.g., box or bag). The system includes one or more autonomous process lines comprising a plurality of robotic devices configured to work in concert to process a dirty load of household laundry from a mass of dirty, non-uniform articles to individually separated, cleaned, unfolded and folded laundry articles. The plurality of robotic devices of the system operate without human intervention to efficiently and effectively launder a customer's dirty items. This disclosure relates to autonomous robotic devices configured to autonomously pack clean, folded and intentionally unfolded deformable laundry articles for return to a residential household. The autonomous robotic devices are configured to fold a plurality of loads of laundry each comprising a plurality of deformable article types. In implementations, each of the plurality of loads of laundry comprises two or more article types comprises a longest dimension of between about 4 cm to 500 cm. Additionally or alternatively, in implementations, the autonomous robotic devices are configured to batch articles for washing that are at least one of small, stiff, and of a particular article type not requiring folding, and deliver those washed and dried unfolded articles to a packing station without folding. For example, the dirty laundry sorting robot 3000 is configured to identify two or more articles smaller than 6 inches (e.g., ~15 cm) in length and width and batch the identified smaller articles for washing together. In implementations, the unfolded laundry articles each measure no more than 15 cm in a shortest dimension.

This prevents smaller articles from entanglement within larger identified laundry articles during washing and drying cycles and enables more efficient washing and drying of those smaller articles that can get entangled in larger articles and prevented from being properly washed and dried. Additionally or alternatively, the washing and drying robots 4000 and the robotic devices receiving washed and dried laundry articles (e.g., one or more clean laundry separating robots 5000, repositioning robots 6000, folding robots 7000, and packing robots 8000) are configured to identify articles for packing without folding and provide these unfolded articles to at least one of an unfolded articles bypass robot 1000 and a packing station 8000.

The laundry articles are collected from a household and delivered to the autonomous process line 100 for cleaning and autonomous packing for return to the household. The autonomous processes are time and cost efficient, eliminate human intervention-based delays, eliminate line workers and associated introduction of human contaminants potentially introduced by line workers, and eliminate any concerns with having private personal items handled by strangers. The folded laundry articles are folded to preset sizes for efficient packing and unloading from a shipping container into a drawer or onto a shelf by the household customer, and the unfolded laundry articles are compactly loaded into the shipping container to reduce occupied volume and the consumable shipping resources associated with transporting containers (e.g., consumable fuel and/or electricity, delivery vehicle wear and tear, etc.).

As shown in FIG. 1, in implementations of the system, a process line 100 comprises a plurality of autonomous robots configured to operate in series without human intervention to process and transport dirty laundry through the cleaning process, folding and repackaging the clean laundry for return to a household. In one implementation, the process line 100 comprises an autonomous intake robot 2000 for receiving a load of dirty household laundry comprising a plurality deformable laundry articles. The deformable laundry articles can be non-uniform in type, size, shape, color, and fabric. For example, the plurality of deformable laundry articles can include items commonly laundered in homes, such as sheets, towels, tablecloths, and adult and children's garments, for example, tee shirts, baby onesies, pants, socks, undergarments, dresses, dress shirts, and blouses. The autonomous intake robot 2000 is configured to introduce the plurality of deformable laundry articles to a separating and sorting robot 3000 configured to separate out each one of the deformable laundry articles of the plurality of deformable laundry articles pertaining to a single customer or household. In implementations, the separating and sorting robot 3000 is configured to autonomously sort each one of the separated deformable laundry articles into one or more related batches for washing. In implementations, the separating and sorting robot 3000 is configured to intelligently batch the separated each one of the deformable laundry articles according to a programmed sorting algorithm based, for example, on criteria including at least one of material color, material type, customer washing preference, water temperature requirements, and load size. In implementations, the separating and sorting robot 3000 is configured to identify and record the number and types of garments in the load of laundry and provide this information to one or more downstream robots in the process line 100.

The separating and sorting robot 3000 outputs one or more intelligently sorted batches of deformable laundry articles to one or more washing and drying robots 4000 for laundering. The intelligently sorted batches comprise, for example, one or more loads of laundry identified for packing without folding, such as small articles comprising at least one of socks, undergarments, hats, gloves, wash cloths, and swimwear. The one or more washing and drying robots 4000 output the clean laundry articles to a clean laundry separating robot 5000. Implementations of the clean laundry separating robot 5000 can be similar or identical to the separating and sorting robot 3000. The clean laundry separating robot 5000 is configured to separate a load of clean laundry into individual deformable laundry articles for introduction into a repositioning robot 6000. The repositioning robot 6000 receives a single deformable laundry article and manipulates and repositions it for automated introduction into a folding robot 7000, which automatically folds the laundry article for introduction to a packing robot 8000. In implementations, the packing robot 8000 is a system comprising one or more autonomous devices working in concert and in series to automatically pack the clean load of laundry comprising the plurality of clean and folded deformable laundry articles in a shipping container for automated redistribution to the residential household customer. In implementations, the shipping container is a reusable container. In implementations, the shipping container is a disposable container. In implementations, the shipping container is a non-deformable container with an ingress protection rating that includes an intrusion protection rating of 5 or 6 and a moisture protection rating of any and all of 1 through 6 in accordance with the Ingress Protection Code, IEC standard 60529. In implementation, the shipping container is a rigid or semi-rigid, collapsible box. In implementation, the shipping container is a bag.

In implementations, the process line 100 comprises one or more bypass robots 1000 for receiving unfolded articles from at least one of the one or more washing and drying robots 4000, the clean laundry separating robot 5000, the repositioning robot 6000, and the folding robot 7000. Each of the one or more bypass robots 1000 is configured to introduce washed, unfolded articles into a shipping container, and at least one of flatten (e.g., level the mass of articles) and compresses the washed, unfolded articles within the shipping container. Each of the one or more bypass robots is configured to deliver a partially filled container to the packing robot 8000 for receiving clean, folded laundry articles atop the unfolded laundry articles flattened and/or compressed in the bottom thereof. In implementations, the clean, unfolded laundry articles can fill the holding volume of the shipping container and a bypass robot 1000 is configured to at least flatten the mound of articles therein for secure closure of the container (e.g., lidded closure, zipped closure, VELCRO closure, snap closure, buckle closure, cinch closure.)

Implementations of the process line 100 of household laundry cleaning robots can comprise one or more of each of the robots depicted in FIG. 1. Additionally, two or more of the robots can be combined in a single module in alternate implementations. In implementations, one or more of the robots in the process line 100 are configured to communicate over wired connections or wireless communication protocols. For example, in implementations, one or more robots in the process line 100 can communicate with another one or more robots in the process line 100 over a wired BUS, LAN, WLAN, 4G, 5G, LTE, Ethernet, BLUETOOTH, or other IEEE 801.11 standard.

Figure 2:
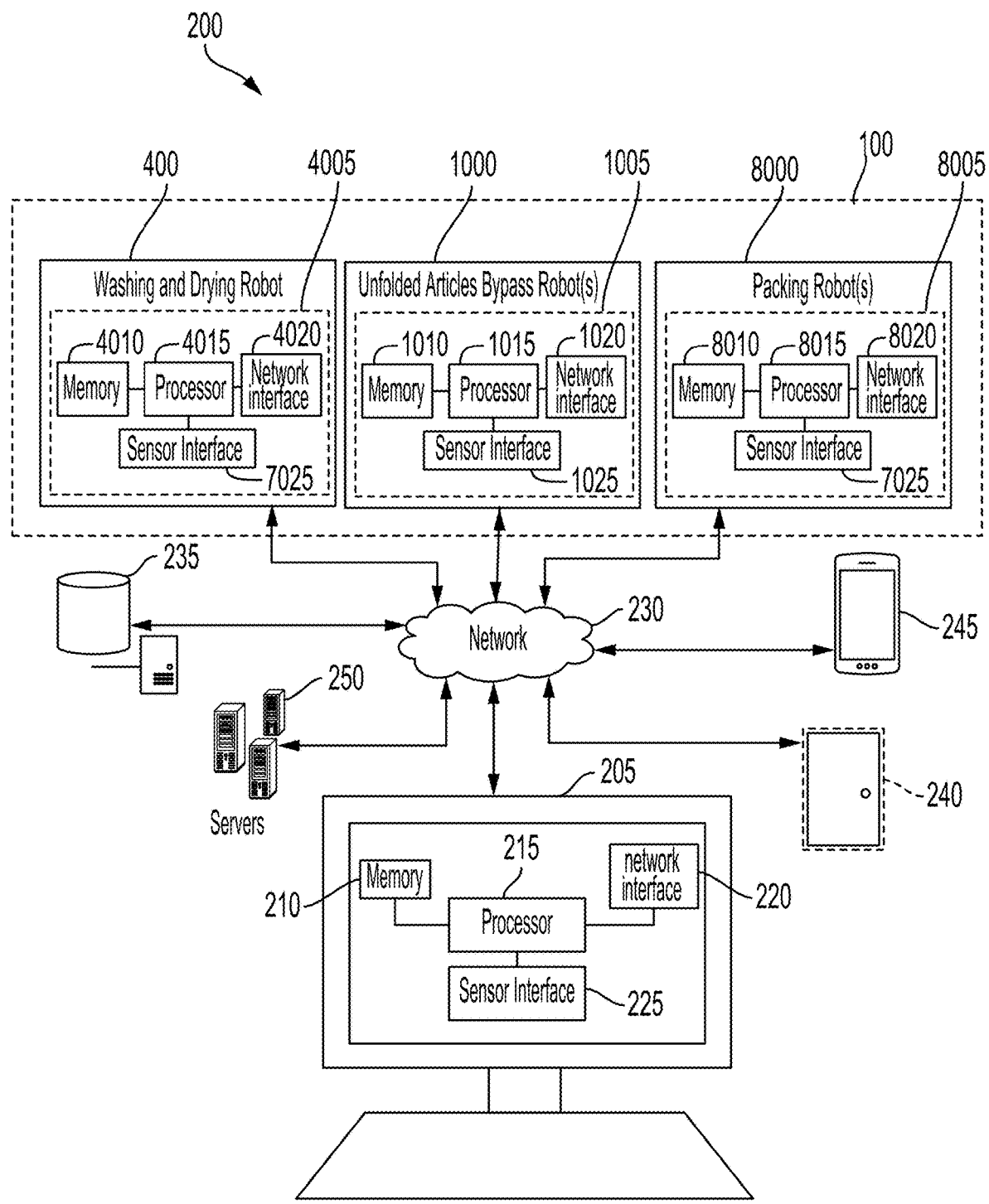
FIG. 2 depicts a schematic example of a system for controlling an autonomous robotic process line.

Referring to FIG. 2, an example of a system 200 of operatively connected autonomous robots is shown. FIG. 2 depicts a schematic implementation of a portion of an autonomous robotic process line 100 that processes the clean deformable laundry articles. An autonomous unfolded articles bypass robot 1000 is in operative communication with an autonomous washing robot 4000 configured to output unfolded laundry articles from a load of household laundry to the unfolded articles bypass robot 1000. Additionally or alternatively, in implementations, as previously described, the bypass robot 1000 is configured to receive clean, unfolded laundry articles from any of the washing and drying robot 4000, the clean laundry separating robot 5000, the repositioning robot 6000, and the folding robot 7000. As shown in FIG. 2, the autonomous unfolded articles bypass robot 1000 is in operative communication with the packing robot 8000 configured to pack one or more boxes or bags for return to the residential household customer. The packing robot 8000 can be one such as that described in U.S. patent application Ser. No. 17/514,700, titled "AUTONOMOUS DEVICES, SYSTEMS, AND METHODS FOR PACKING FOLDED LAUNDRY", herein incorporated by reference in its entirety. In implementations, each robot 4000, 1000, 8000 includes a controller 4005, 1005, 8005 configured to operate the associated robot.

For example, in implementations, the unfolded articles bypass robot 1000 includes one or more controllers 1005. Each of the one or more controllers 1005 includes a processor 1015 in communication with a memory 1010, a network interface 1020, and a sensor interface 1025. The processor 1015 can be a single microprocessor, multiple microprocessors, a many-core processor, a microcontroller, and/or any other general purpose computing system that can be configured by software and/or firmware. In implementations, the memory 1010 contains any of a variety of software applications, algorithms, data structures, files and/or databases as appropriate to the requirements of repositioning non-uniform deformable laundry articles. In one implementation, the controller 1005 includes dedicated hardware, such as single-board computers, one or more GPUs, application specific integrated circuits (ASICs), and field programmable gate arrays (FPGAs).

A network interface 1020 is configured to couple the controller 1005 to a network 230. The network 230 may include both private networks, such as local area networks, and public networks, such as the Internet. It should be noted that, in some examples, the network 230 may include one or more intermediate devices involved in the routing of packets from one endpoint to another. In implementations, the network interface 1020 is coupled to the network 230 via a networking device, such as a bridge, router, or hub. In other implementations, the network 230 may involve only two endpoints that each have a network connection directly with the other. In implementations, the network interface 1020 supports a variety of standards and protocols, examples of which include USB (via, for example, a dongle to a computer), TCP/IP, Ethernet, Wireless Ethernet, BLUETOOTH, ZigBee, M-Bus, CAN-bus, IP, IPV6, UDP, DTN, HTTP, FTP, SNMP, CDMA, NMEA and GSM. To ensure data transfer is secure, in some examples, the controller 1005 can transmit data via the network interface 1020 using a variety of security measures including, for example, TLS, SSL or VPN. In implementations, the network interface 1020 includes both a physical interface configured for wireless communication and a physical interface configured for wired communication. According to various embodiments, the network interface 1020 enables communication between the controller 1005 of the unfolded articles bypass robot 1000 and at least one of the plurality of robots 2000, 3000, 5000, 6000, 7000, 8000, 9000 of the process line 100.

Additionally or alternatively, the network interface 1020 is configured to facilitate the communication of information between the processor 1015 and one or more other devices or entities over the network 230. For example, in implementations, the network interface 1020 is configured to communicate with a remote computing device such as a computing terminal 205, database 235, server 240, smartphone 245, and server farm 250. In implementations, the network interface 1020 can include communications circuitry for at least one of receiving data from a database 235 and transmitting data to a remote server 240, 250. In some implementations, the network interface 1020 can communicate with a remote server over any of the wired protocols previously described, including a WI-FI communications link based on the IEEE 802.11 standard.

In some examples in accordance with FIG. 2, the network 230 may include one or more communication networks through which the various robots and computing devices illustrated in FIG. 2 may send, receive, and/or exchange data. In various implementations, the network 230 may include a cellular communication network and/or a computer network. In some examples, the network 230 includes and supports wireless network and/or wired connections. For instance, in these examples, the network 230 may support one or more networking standards such as GSM, CMDA, USB, BLUETOOTH®, CAN, ZigBee®, Wireless Ethernet, Ethernet, and TCP/IP, among others. In implementations, the network 230 can implement broadband cellular technology (e.g., 2.5 G, 2.75 G, 3 G, 4 G, 5 G cellular standards) and/or Long-Term Evolution (LTE) technology or GSM/EDGE and UMTS/HSPA technologies for high-speed wireless communication.

Although an embodiment of a controller 1005 of the unfolded articles bypass robot 1000 is described herein in particular, one or more of the plurality of robots 2000, 3000, 4000, 5000, 6000, 7000, 8000, 9000 of the process line 100 includes similar components having similar functionality.

In implementations, autonomous unfolded articles bypass robot(s) 1000 (also alternatively referred hereinafter as the unfolded laundry article system 1000) can be a system comprising one or more autonomous devices working in concert to load, flatten, and compress one or more unfolded laundry articles into a container for passing to the packing robot 8000 for additional filling of any remaining unoccupied volume within the container and return shipping to a residential household from which the items were retrieved for laundering.

Figure 3:
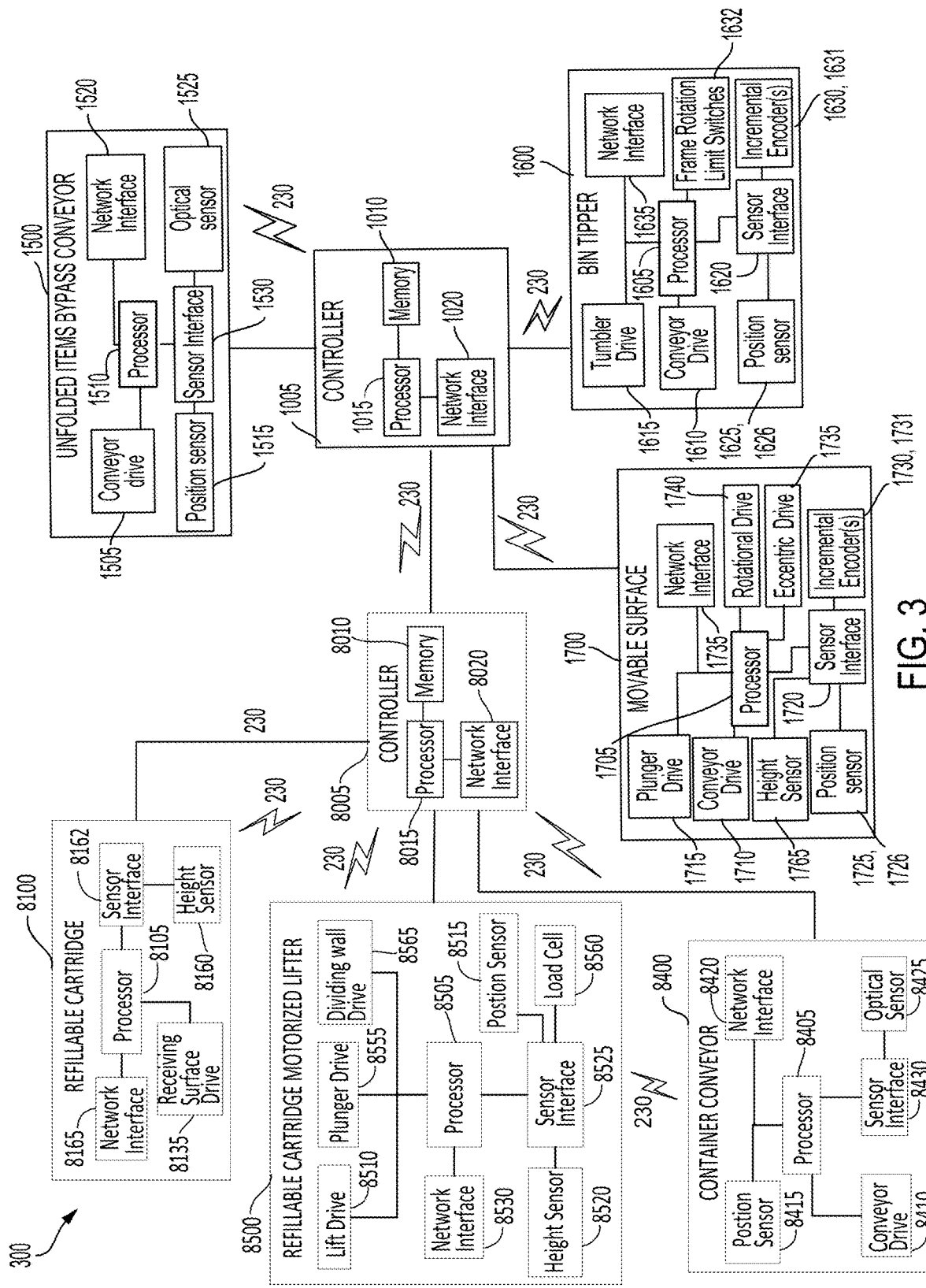
FIG. 3 depicts a schematic example of an unfolded articles bypass system for packing both unfolded household laundry articles and unbound, folded household laundry articles into a shared shipping container.

Turning to FIG. 3, a schematic of an implementation of controls systems for an unfolded articles bypass and packing system 300 is shown. The system 300 includes one or more of the features described with regard to the embodiments of FIGS. 1 and 2. In implementations, the system 300 comprises a plurality of sensors, processors, interfaces, drives and other operably controllable elements of interactive autonomous robotic devices. In implementations the system 300 comprises controls for an unfolded items bypass conveyor 1500, a bin tipper 1600, a funnel 1695, and a movable surface 1700. In implementations, at least one controller comprising at least one of central controller 205, a packing controller 8005, and the unfolded articles bypass robot controller 1005, is in operative configuration with processors and drives of all of the foregoing. The system comprises controls for at least one folded laundry loader including at least one of a trap door assembly and a refillable cartridge 8100.

In implementations, the folded laundry loader comprises a refillable cartridge 8100, and the system 300 further comprises a container conveyor 8400 configured to align an empty container (e.g., box) with the refillable cartridge 8100 for filling, a driven lifter 8500 for selectively raising and lowering the refillable cartridge 8100 into and out of the container, and a packing controller 8005 in operative configuration with processors and drives of all of the foregoing and one or more sensors detecting a fill height of the refillable cartridge 8100. In implementations, the unfolded articles bypass controller 1005 and the packing controller 8005 are in wired and/or wireless communication via a communication network as previously described with regard to FIG. 2. In implementations, the unfolded articles bypass controller 1005 and the packing controller 8005 are combined in a single controller. In implementations, the movable surface 1700 delivers a container to the container conveyor 8400 and the container is pre-loaded with unfolded small articles at the bottom of the container that have bypassed a folding robot because they are identified by one or more robots as being at least one of too small, too difficult, too stiff, and unnecessary to fold, articles such as socks, undergarments, hats, gloves, wash cloths, and swimwear, for example. The unfolded articles bypass robot(s) 1000 will subsequently be described with regard to implementations.

Figure 4A:
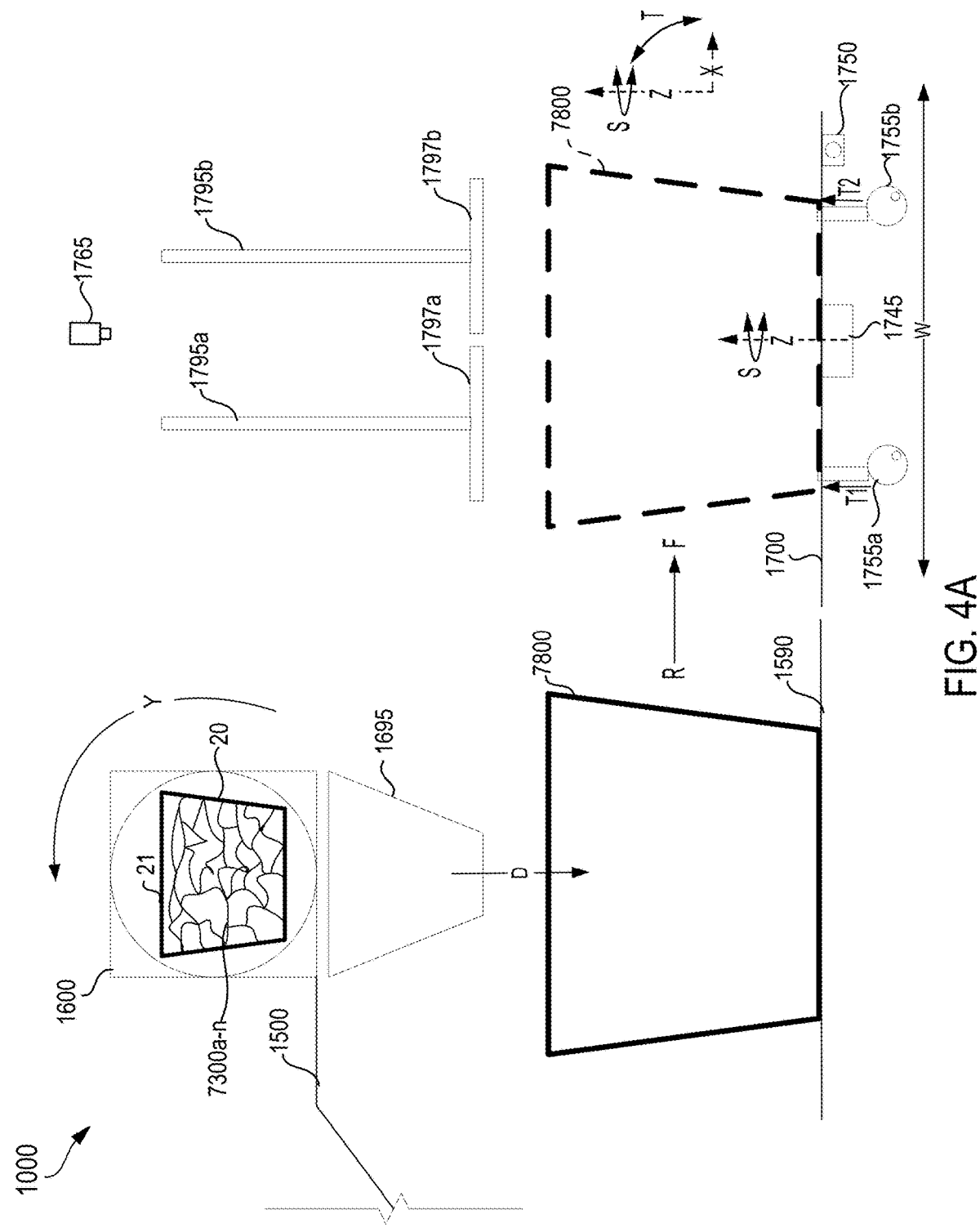
FIG. 4A depicts an example configuration of an empty container and a bin tipper the container being positioned beneath the bin tipper containing the unfolded laundry articles.
Figure 4B:
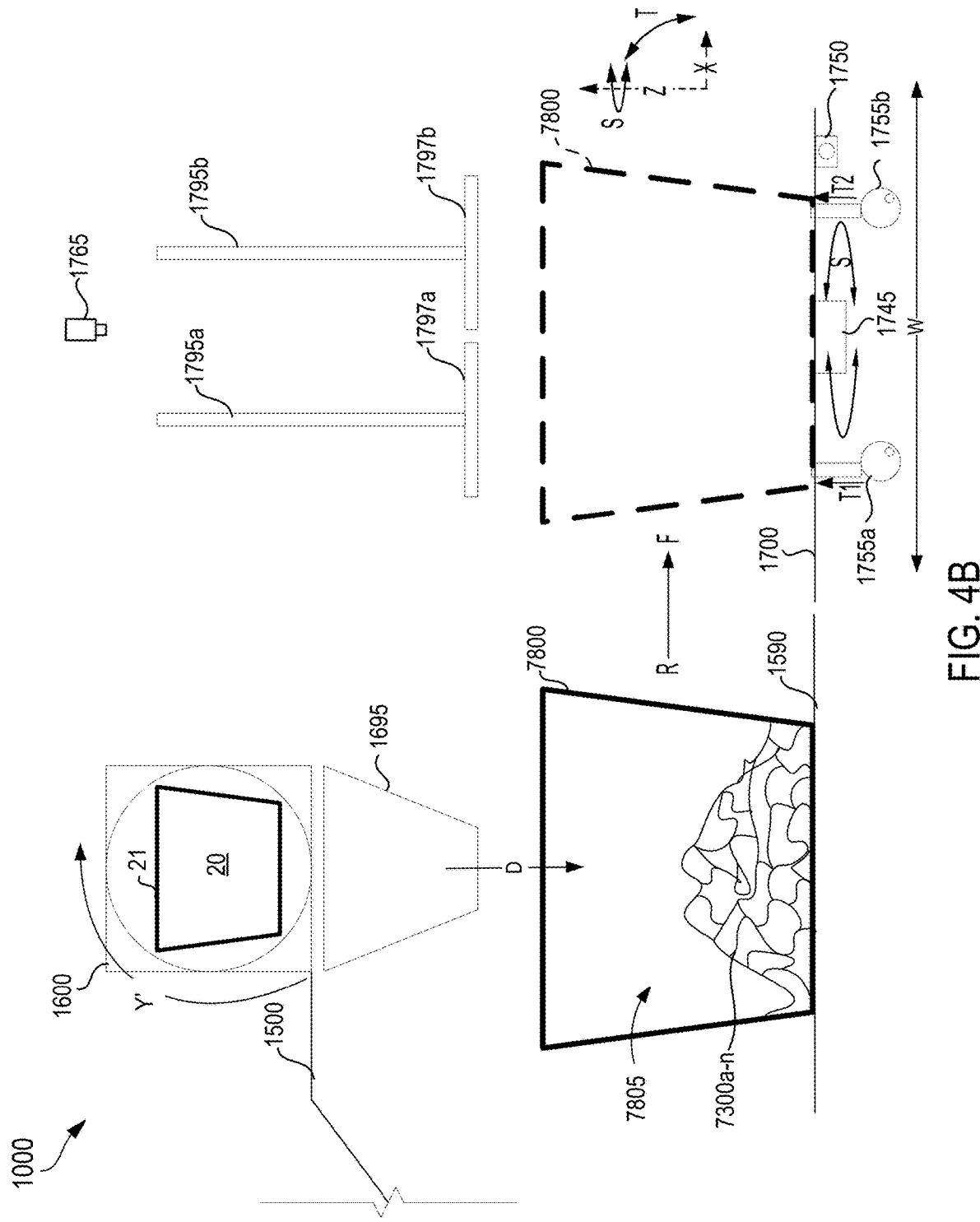
FIG. 4B depicts the system of FIG. 4A with the unfolded laundry articles emptied into the container.
Figure 4C:
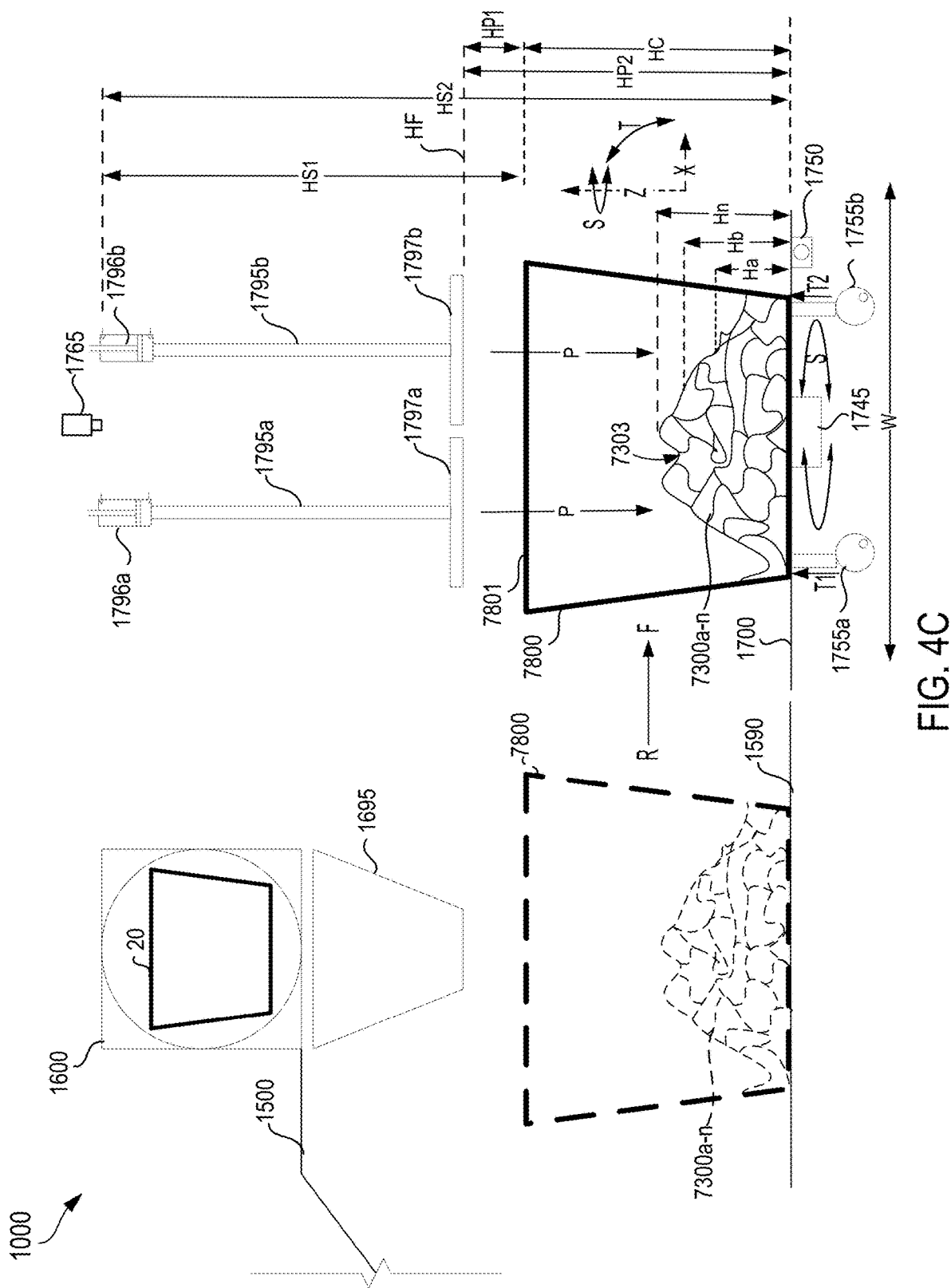
FIG. 4C depicts the partially filled container of FIG. 4B transited to a second of two positions for flattening and leveling the plurality of laundry articles therein.

Turning now to FIGS. 4A-C, a system for packing unfolded laundry articles comprises a container 7800 configured to receive a plurality of unfolded laundry articles 7300a-n, a staging conveyor 1590 for positioning the container 7800 beneath a bin tipper 1600 for and a movable surface 1700 disposed adjacent the staging conveyor configured to receive the container 7800 thereon. (Throughout the description herein "n" is used to indicate a non-determinative number of units greater than two (2) and is not intended to be limited to the number of elements shown in figures with a limited number of elements.) In implementations, as shown in FIG. 4A, the container 7800 receives the plurality of unfolded laundry articles 7300a-n from an overhead bin tipper 1600 and funnel 1695 as the articles drop in the direction of arrow D. As previously described, in implementations, the container 7800 comprises at least one of a bag and a box. In implementation, the shipping container 7800 is a rigid or semi-rigid box. In implementations, the shipping container is a bag. In implementations, the shipping container 7800 is a reversibly collapsible box configured to withstand handling by the robots 1000, 8000 and delivery systems and also configured to collapse for compact storage when not in use. In implementations, the shipping container 7800 comprises a lid or other closure mechanism for hygienic transport of the clean laundry articles contained therein. A bypass robot 1000 is configured to deliver a partially filled container 7800 to the packing robot 8000 for receiving clean, folded laundry articles atop the unfolded laundry articles flattened and/or compressed in the bottom thereof. In implementations, the clean, unfolded laundry articles can fill the holding volume of the shipping container and a bypass robot 1000 is configured to at least flatten the mound of articles therein for secure closure of the container 7800 (e.g., lidded closure, zipped closure, VELCRO closure, snap closure, buckle closure, cinch closure).

Figure 16B:
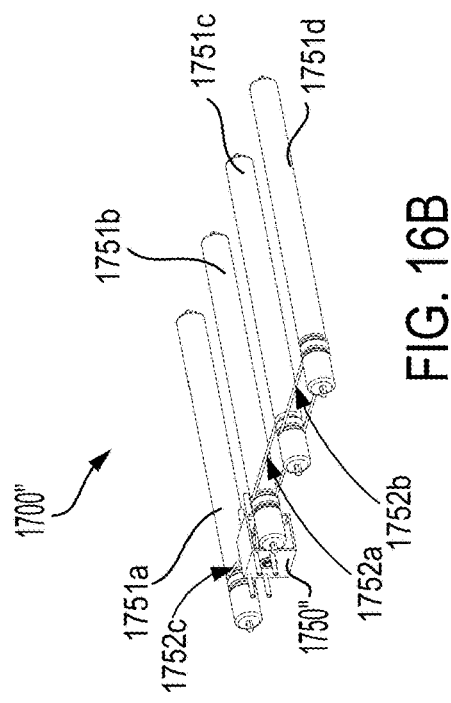
FIG. 16B depicts an example of a movable surface comprising plurality of synchronously rotating rollers.

Returning to FIG. 4A, the container 7800 transits from a staging conveyor 1590 beneath the bin tipper 1600 and funnel 1694 in the direction of arrow R-F to a flattening station at the movable surface 1700. in implementations, the staging conveyor and movable surface 1700 comprise portions of a continuous movable surface. In implementations, the staging conveyor 1590 is the only movable surface. In implementations the staging conveyor 1590 and movable surface 1700 each comprise at least one of a conveyor belt, driven rollers, spaced apart chain driven pusher and passive roller rail pairs (FIG. 16A), and a single of driven roller geared or belted together with a plurality of rollers for simultaneous rotation of the plurality of driven rollers (FIG. 16B). In the spaced apart chain driven pusher and passive roller rail pairs implementation of FIG. 16B, a pair of parallel rails 1701a, 1701b comprises corresponding ones of a plurality of passive rollers 1702a-b configure to support the bin 20 thereon and loops of chain or belt 1704a-b having attached thereto one or more pusher bars 1703a-a', 1703b-b'. A drive motor 1750' is configured to synchronously rotate the loops 1704a-b in one direction or the other such that the one or more pusher bars 1703a-a', 1703b-b' engage one end or the other of the bin 20 to move it along the plurality of passive rollers 1702a-b. The one or more pusher bars 1703a-a', 1703b-b' are configured to loop around the ends of parallel rails 1701a, 1701b to receive and push the next bin delivered to the movable surface 1700'. With regard to the implementation of FIG. 16, elements therein are correspondingly numbered to those of the bin tipper conveyor 1650 of FIG. 13 and function as described with regard to that implementation of a roller conveyor.

Returning again to FIG. 4A, at least one actuator (e.g., drive motor 1745, drive motor 1750, actuator(s) 1755a-b) is configured to impart motion to container 7800 and the received plurality of unfolded laundry articles disposed within the container 7800. As indicated in FIGS. 3 and 4A-C, the at least one actuator comprises at least one of a drive motor 1750 configured to rotate the at least one of the conveyor belt, the driven rollers, spaced apart chain driven pusher and passive roller rail pairs (FIG. 16A), and the plurality of driven rollers geared or belted together of the movable surface 1700 to move the container 7800 in a side-to-side shaking movement as indicated by double arrow W. Additionally or alternatively, the at least one actuator comprises a driven at least one cam and follower assembly 1755a-b configured to raise and lower one or both ends of the container 7800. In implementations, the at least one cam and follower assembly comprises at least two cam and follower assemblies 1755a-b, each one of which is centrally located beneath the ends of the container 7800. The at least two cam and follower assemblies are configured to raise and lower the ends of the container 7800 in alternating tipping motions as indicated by arrows T1-T2. Additionally or alternatively, in implementations, the at least one actuator comprises a rotational motor 1745 configured to twist the movable surface 1700 and box thereon in one of clockwise and counter clockwise movements, or alternating clockwise and counter clockwise movements about a vertical axis Z as indicated by double arrow S. In implementations, at least one of side clamps (e.g., clamps such as 1670a-b of the bin tipper) and/or one or more top down clamps (not shown) are configured to actuate and retain the container on the movable surface during spinning (e.g., twisting). In implementations, the at least one controller 1005 is configured to instruct a clamp (not shown) to clamp the container to the surface 1700 and release the container 7800 upon cessation of spinning.

The shaking, tilting, vibrating, shushing and/or twisting imparts forces including at least one of centrifugal force, linear force, and vibrational force on the plurality of laundry articles. The imparted forces flatten any mounds of laundry articles to a more uniform height distribution throughout the interior volume of the container 7800 thereby creating a substantially flat surface. The substantially flat top surface 7303 (FIG. 7C) of the plurality of laundry articles can then receive thereon one or more folded laundry articles 7301*a-n* and/or stacks 7302*a-n* of folded laundry articles. The folded laundry articles 7301*a-n* sit securely upon the substantially flat, level surface of the unfolded plurality laundry articles 7300*a-n* without tipping. Additionally or alternatively, in implementations the movable surface 1700 is disposed on at least one of a shake table and an eccentric turntable for at least one of, simultaneously or in sequence one or more times, shaking, oscillating, tipping, shushling (e.g. at least two of shaking back and forth, oscillating, and tipping in sequence one or more times), and/or vibrating the contents within the container 7800 to flatten and level any mounds of laundry articles to more uniform height distribution.

Additionally or alternatively, the system includes one or more stirring devices or other mechanical agitation devices configured to be actuated inside the container 7800 for redistributing the plurality of unfolded laundry articles 7300*a-b* therein to a collectively flattened configuration. Additionally or alternatively, in implementations, a staging conveyor 1590 beneath the bin tipper 1600 and funnel 1695 can be disposed on at least one of a shake table and an eccentric turntable for at least one of, simultaneously or in sequence one or more times, shaking, oscillating, tipping, shushling (e.g. at least two of shaking back and forth, oscillating, and tipping simultaneously or in sequence one or more times), and vibrating the contents within the container 7800 to flatten any mounds of laundry articles 7300*a-n* to more uniform (e.g., leveled) surface height distribution. Additionally or alternatively, the staging conveyor 1590 beneath the bin tipper 1600 and funnel 1695 can impart motion to the container as the bin tipper 1600 provides the plurality of unfolded laundry articles 7300*a-n* to the container 7800 such that the unfolded laundry articles are deposited and/or redistributed gradually in an even height distribution. Implementations comprising the application of motion at the staging conveyor 1590 can be instead of or in addition to motion provided at the movable surface 1700. In implementations, the staging conveyor 1590 and movable surface 1700 are portions of one combined movable surface.

In implementations, the system includes at least one plunger 1795*a-b* disposed above the movable surface 1700 and configured to compress (e.g., make compact in the vertical direction) the plurality of unfolded laundry articles 7300*a-n* disposed in the container 7800. In implementations, the system comprises a drive mechanism to lower and raise the at least one plunger 1795, 1995*a-b*, such as linear drive motors, hydraulics, springs, etc. The at least one plunger 1795*a-b* is configured to contact the plurality of unfolded laundry articles 7300*a-n* and apply downward force in the plunger travel direction P to compress the laundry articles 7300*a-n* as compactly as possible in the bottom of the container 7800, leaving additional, unoccupied volume within the interior 7805 container 7800 for placement of folded articles 7301*a-n* atop the unfolded, compressed laundry articles 7300*a-n*. In implementations, the at least one plunger 1795*a-b* is operably connected to a drive mechanism to lower and raise the at least one plunger 1795, 1795*a-b*. In implementations, the drive mechanism comprises at least one of a linear drive motor, hydraulics, springs, etc. In implementations, the linear actuator is a piston 1796*a-b*. As depicted in FIGS. 3 and 4C, in implementations, the system further includes at least one sensor 1765 disposed proximate the movable surface. The at least one sensor 1765 is configured to detect container fill heights Ha-Hn along a top surface 7303 of the plurality of unfolded laundry articles disposed within the container 7800. In implementations, the at least one plunger 1795*a-b* is actuated in addition to imparting motion on the container 7800 at one or both of the staging conveyor 1590 and movable surface 1700.

As described previously with regard to FIG. 3, at least one controller 1005, 8005, 205 is in operable communication with the at least one actuator imparting motion to the container 7800, the at least one piston 1796*a-b*, and the at least one sensor 1765. The at least one controller 1005, 8005, 205 is configured to instruct the at least one actuator, such as the conveyor drive 1710, the eccentric drive 1735, and the rotational drive 1740 to at least one of shake, tilt, and spin the container 7800 disposed on the movable surface 1700. The at least one controller 1005, 8005, 205 is configured to instruct the at least one plunger 1795*a-b* to compress the plurality of unfolded laundry articles 7300*a-n*. The at least one controller 1005, 8005, 205 is configured to receive an output signal from at least one sensor 1765 and analyze the received output signal to determine whether the container fill heights detected along the top surface top surface 7303 of the plurality of unfolded laundry articles 7300*a-n* comprise a maximum height variation within a threshold range for at least one of determining flatness and levelness of the top surface top surface 7303 and determining enough volume remaining in the interior 7805 of the container for accepting additional, folded laundry articles 7301*a-n* from the packing robot 8000. Based on an analysis indicative of the maximum height variation being within the threshold range, the at least one controller 1005, 8005, 205 is configured to instruct the drive motor 1750 of the movable surface 1700 to transit the container 7800 to a packing robot 8000 for receiving one or more folded laundry articles 7301*a-n* atop the compressed plurality of unfolded laundry articles 7300*a-n*. In implementations, the at least one sensor 1765 comprises at least one of one or more lasers, one or more photo electric distance sensors, one or more optical or ultrasonic range sensors, and one or more depth cameras (e.g., REALSENSE depth camera) detect distance from the fixed camera height to one or more positions on the top surface top surface 7303 of the mass comprised of the plurality of unfolded laundry articles 7300*a-n*.

Figure 7B:
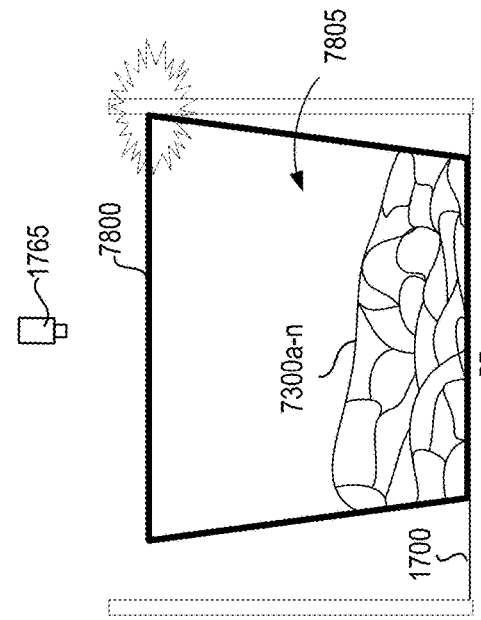
FIG. 7B depicts the system of FIG. 7A in which the container is moved into contact with one vertical wall.
Figure 7D:
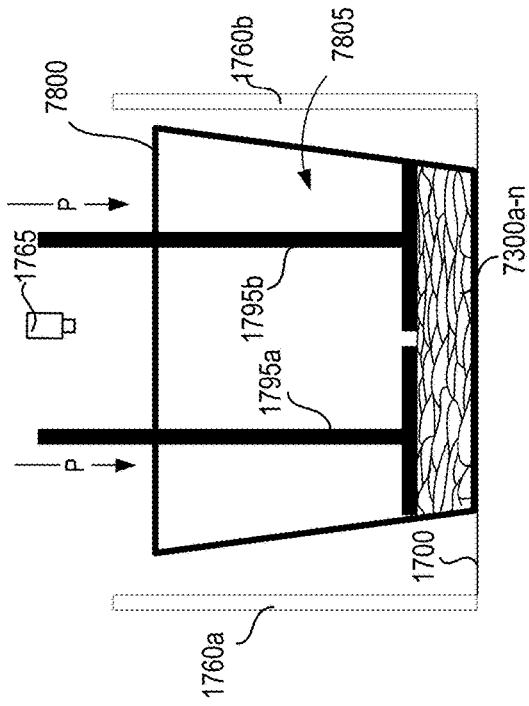
FIG. 7D depicts the system of FIGS. 7A-7C in which plungers compress unfolded laundry articles within the box.
Figure 7A:
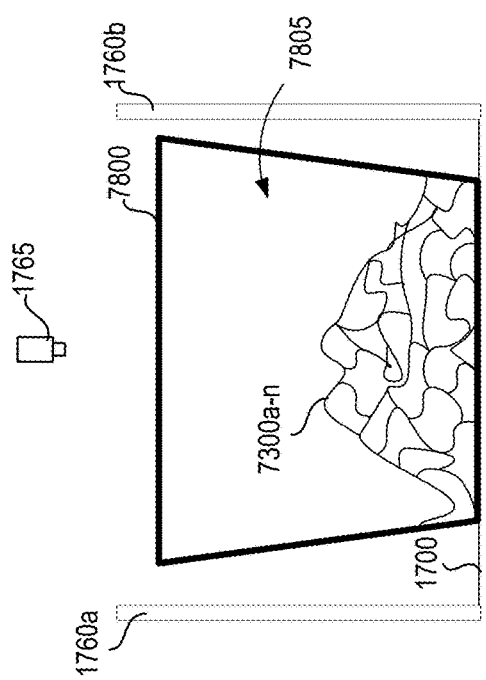
FIG. 7A depicts an alternate example of a portion of the system of FIG. 4 comprising vertical walls on either side of a container disposed on a movable surface, the container being shown in cross section to reveal an example distribution of unfolded laundry articles therein.
Figure 7C:
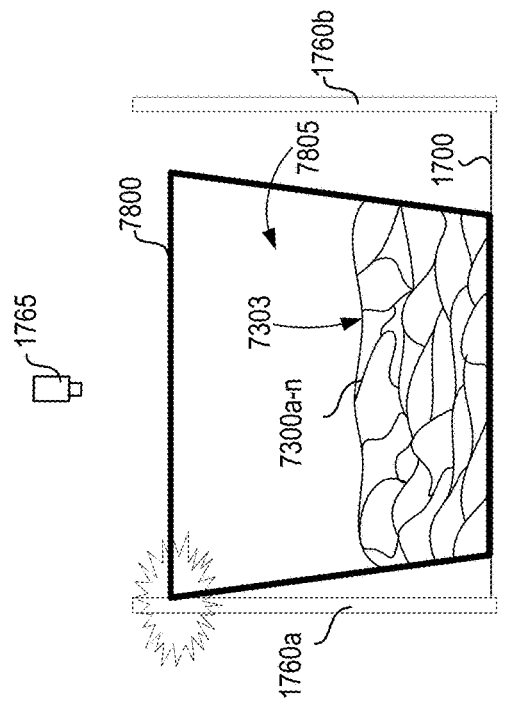
FIG. 7C depicts the system of 7B in which the container is moved into contact with the opposite vertical wall.
Figure 8B:
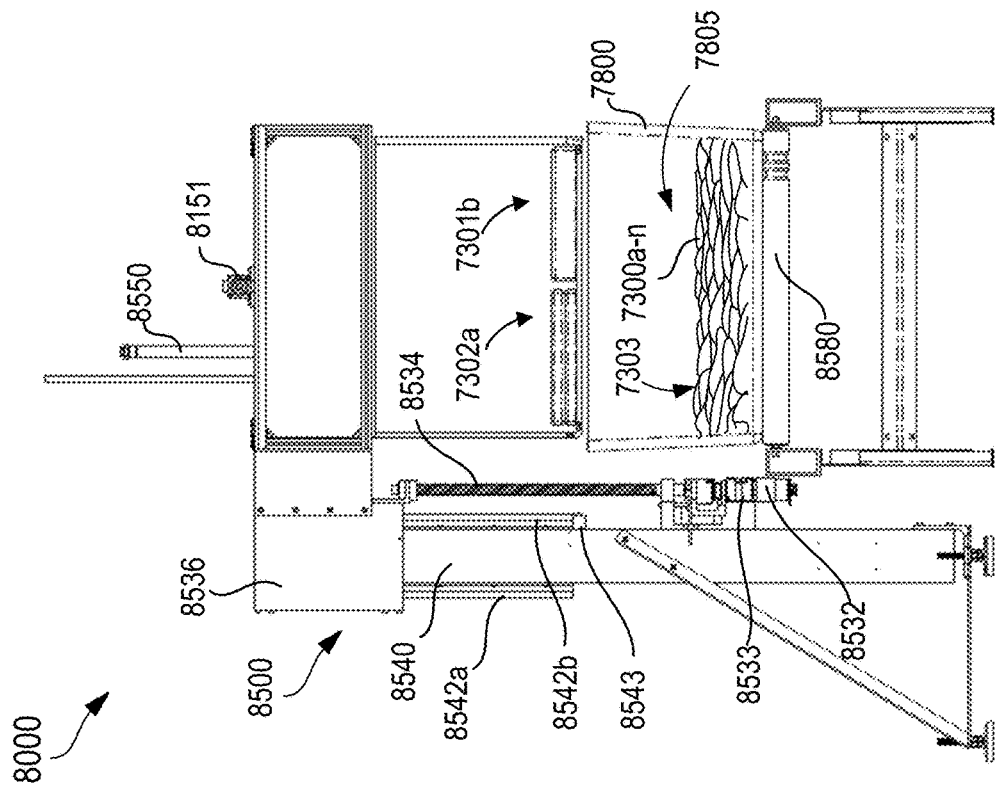
FIG. 8B depicts a front view of FIG. 8A with the cartridge disposed above the container for delivering folded laundry into the container, with the front wall of the box cross sectioned to show the unfolded laundry articles compressed within the container for receiving folded laundry articles thereon, and with a partial cutaway of a refillable cartridge showing folded articles(s) loaded therein.
Figure 8A:
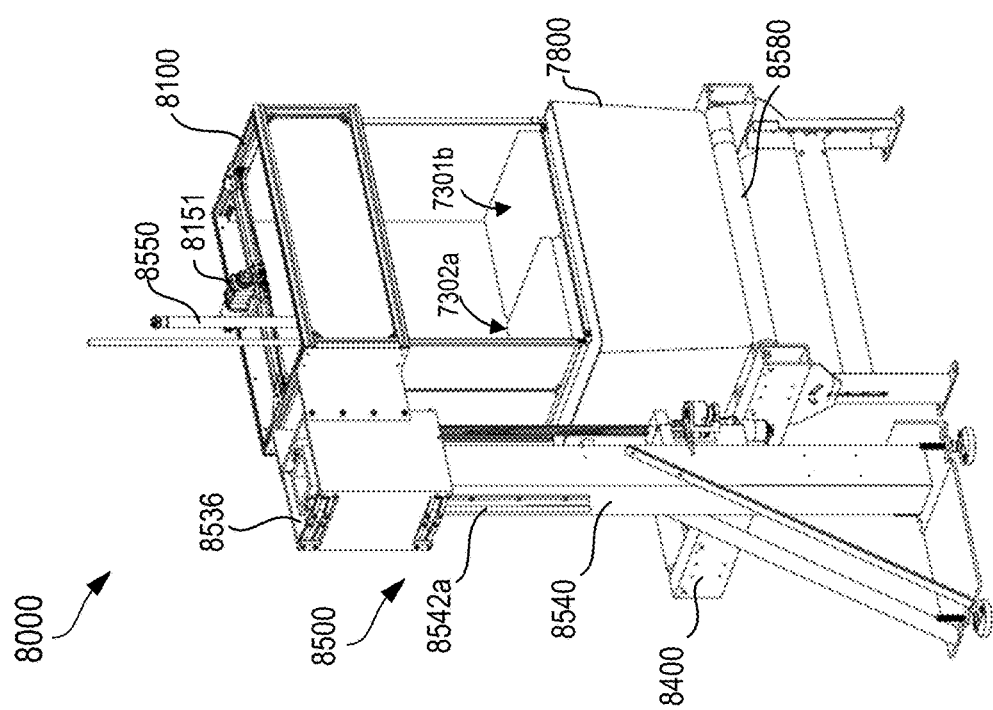
FIG. 8A depicts a perspective view of an example of a refillable cartridge disposed on a movable support for loading folded laundry into a container thereunder that is partially filled with unfolded laundry articles.

Based on the detected distances and the known height HC (FIG. 4C) of the interior of the bottom of the container on the movable surface 1700 to the top rim of the container, the at least one controller 1005, 8005, 205 (e.g., bypass robot controller 1005) is configured to determine a flatness and levelness the top surface 7303 (e.g., FIG. 7C). Additionally or alternatively, the at least one controller 1005, 8005, 205 (e.g., bypass robot controller 1005) is configured to calculate a delta between a highest surface peak and lowest valley. Additionally or alternatively, the at least one controller 1005, 8005, 205 (e.g., bypass robot controller 1005) is configure to determine a widest dimension of a planar area footprint of a mound of laundry articles or a widest dimension of a planar area footprint of a trough of laundry articles and determine whether either widest dimension is within a tolerance range acceptable for proceeding with at least one of plunging and sending to packing for receiving folded laundry articles thereon. If a number (e.g., between 10-20) and planar area footprint (e.g., smaller than 10 cm) of peaks and troughs are low enough to prevent destabilization of folded laundry articles, the unfolded laundry articles are deemed acceptable for transiting to the packing robot 8000.

In implementations, as shown in FIG. 4A, the container 7800 receives the plurality of unfolded laundry articles 7300a-n from an overhead bin tipper 1600 and funnel 1695. The bin tipper 1600 will be described in more detail subsequently with regard to implementations. In implementations, the system 1000 further comprises a conveyor 1500 configured to transit a bin 20 containing the plurality of unfolded laundry articles 7300a-n from one or more robots in the process line 100. In implementations, as previously described, the bypass robot 1000 is configured to receive clean, unfolded laundry articles from any of the washing and drying robot 4000, the clean laundry separating robot 5000, the repositioning robot 6000, the folding robot 7000, and the packing robot 8000 via one or more conveyors, movable carts, robotic arms, and overhead lifters. Any of the clean robots 4000, 5000, 6000, 7000, 8000 can identify an unfolded and/or unfoldable article for delivery to the container 7800 either by passing the identified article through the process line 100 to the packing station, by handing off the article to another bypass conveyor leading to the bypass robot 100, or by having the article removed by a robotic gripper and either placed in a container or transited to the bypass robot 1000 via an overhead crane arm, an autonomous cart, or a delivery chute or conveyor.

Figure 5:
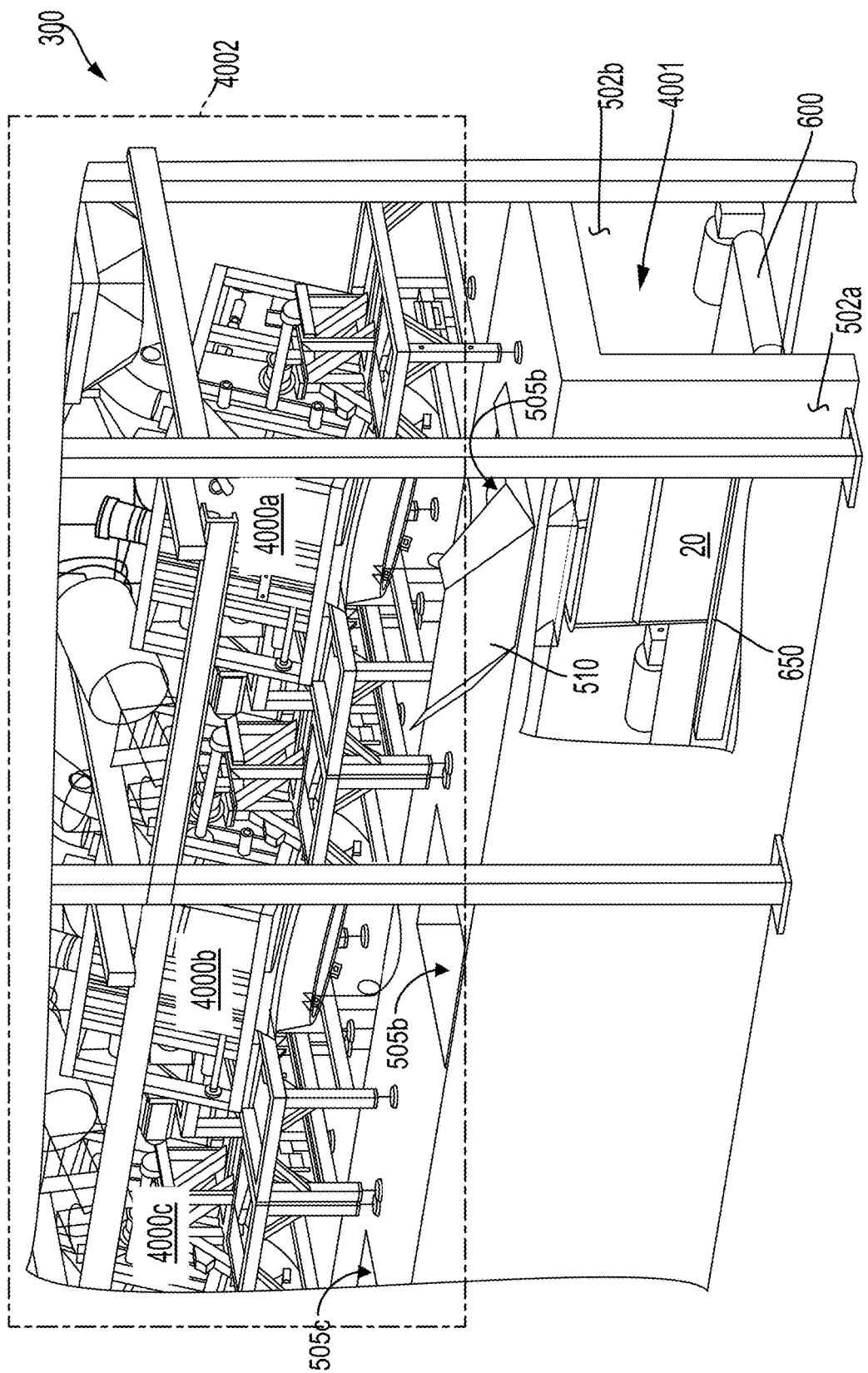
FIG. 5 depicts an implementation of a clean laundry collection system serving a plurality of washing and drying devices with a partial cut away view showing a conveyor and bin inside a clean bin tunnel disposed beneath a plurality of washing and drying devices.
Figure 6:
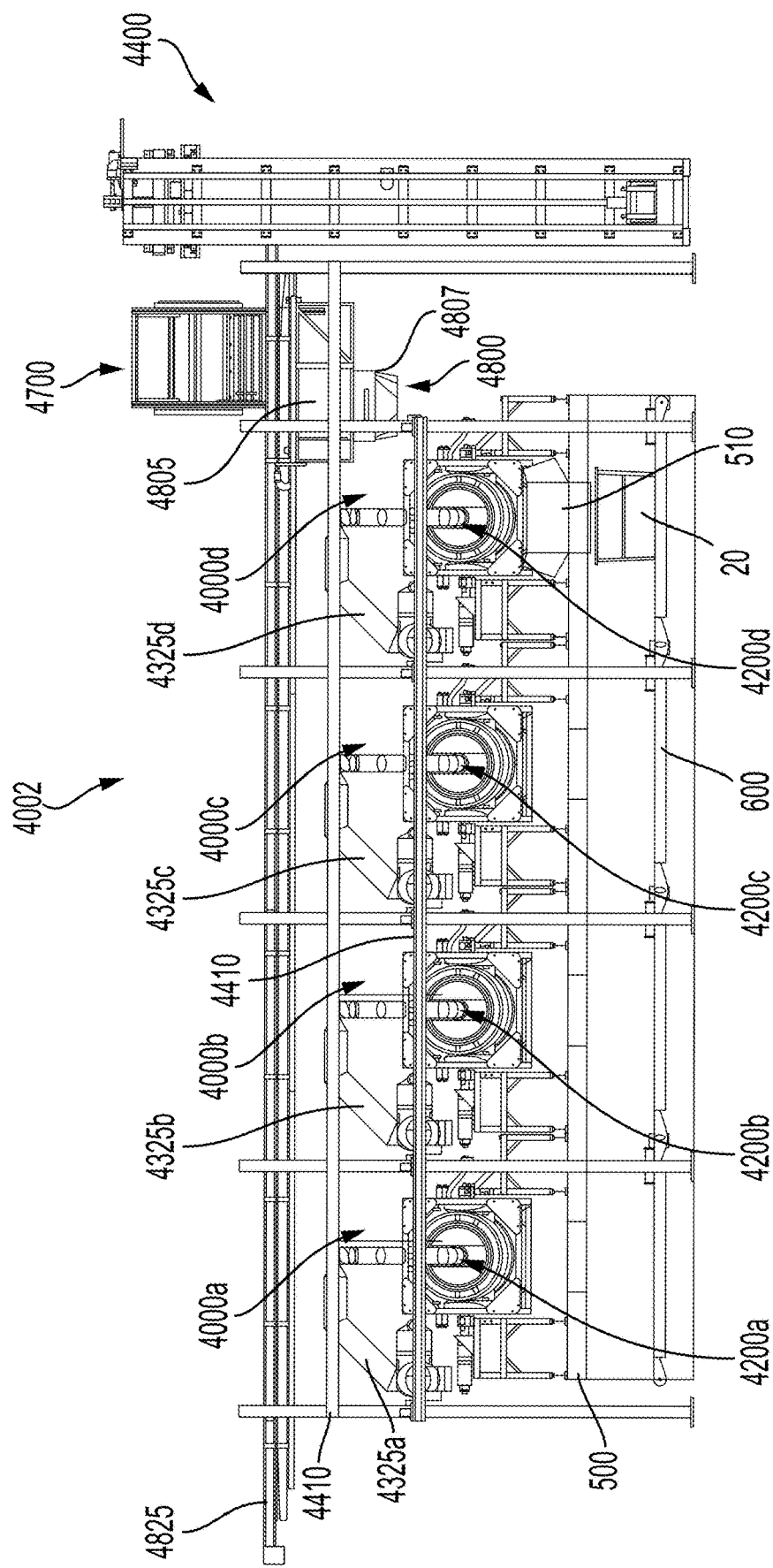
FIG. 6 depicts a schematic front view of a plurality of autonomous washing and drying devices with a solid portion shown as transparent for viewing an enclosed clean bin conveyor disposed beneath the plurality of devices.

In implementations, a conveyor 1500 is configured to transit a bin 20 containing the plurality of unfolded laundry articles 7300a-n from a clean tunnel 4001 beneath a cluster 4002 of tilting autonomous washing and drying machines 4000a-n to the bin tipper 1600. As shown in FIGS. 5 and 6, a clean bin 20 is positioned within an open or enclosed tunnel 4001. In the implementation of FIG. 5, the enclosed tunnel comprises a platform 500 and walled sides 502a-b. A plurality of openings 505a-n in the platform 500 are disposed beneath corresponding ones of each of a plurality of washing and drying devices 4000 in a cluster 4002. Each one of the plurality of openings 505a-n comprises a clean chute 510, 510a-n disposed adjacent the opening 505, 505a-n for guiding falling, clean, deformable articles 7300a-n through the opening 505, 505a-n into a clean bin 20 positioned therebeneath. In implementations, the clean bin 20 can be autonomously positioned beneath a washing and drying device 4000 by an autonomously operated conveyor 600 in operable communication with the washing and drying robot controller 4005. In implementations, the clean bin 20 and autonomously operated conveyor 600 can operate within a sealed clean tunnel 4001 disposed beneath the cluster 4200 of washing and drying devices 4000a-d aligned with a corresponding plurality of selectively sealed openings 505, 505a-n for exposing the clean bin 20 only when the at least one deformable article 7300, 7300a-n is cleaned and dried and ready for dropping from the drum 4205 of a washing and drying device 4000.

In implementations, the clean tunnel conveyor 600 comprises a processor 610 in wired or wireless communication with the controller 4005 via a network interface 620. The conveyor 600 comprises a conveyor drive 605 in operable communication with a drive motor configured to rotate the conveyor belt and transit the clean bins 20 beneath a washing and drying device 4000 for filling and to transit the filled bins 20 to at least one of the conveyor 1500 of the unfolded articles bypass robot 1000 and the clean laundry separating robot 5000. The washing and drying robot 4000 can receive data from the dirty laundry separating and sorting robot indicative of a load of one or more laundry articles being identified for delivery to the unfolded articles bypass robot 1000 instead of to the clean laundry separating robot 5000. In implementations, the clean tunnel conveyor 600 is disposed end to end with the conveyor 1500. In implementations, the clean tunnel conveyor 600 is a terminal portion of the conveyor 1500. In implementations, the clean tunnel conveyor 600 is operably connected to the conveyor 1500 by one or more intermediary conveyors, turn table stations, and autonomously driving carts.

In implementations, the conveyor 1500 is configured to receive the clean bin 20 from the clean tunnel conveyor 600 at a bifurcation (e.g., a conveyor turntable) that leads to either the unfolded articles bypass robot 1000 or the clean laundry separating robot 5000. In implementations, the conveyor 1500 includes an upward slope such that when the bin enters the bin tipper 1600, the bin 20 is raised to a height above a waiting container 7800 poised beneath the bin tipper 1600 and funnel 1695 for receipt of the plurality of unfolded laundry articles 7300a-n. Alternatively, in implementations, the conveyor 1500 is disposed on an upper mezzanine and remains level, and the funnel and 1695 container 7800 positioned therebeneath are disposed no a lower mezzanine.

In implementations, the unfolded articles each measure no more than 15 cm in a shortest dimension. In implementations, the unfolded articles each measure no more than 15 cm in both length and width Additionally or alternatively, in implementations, the unfolded articles each weigh no more than 0.1 kg. In implementations, the unfolded laundry articles comprise articles identified by a separating and sorting robot 3000 as being at least one of small (e.g., a baby sock, a washcloth, a hat) and unable to be folded (e.g., too stiff, such as a down filled glove, and too delicate, such as a brazier or silk camisole). The separating and sorting robot 3000 can be that described in detail in U.S. application Ser. No. 17/503,902, titled "ROBOTIC LAUNDRY SORTING DEVICES, SYSTEMS, AND METHODS OF USE", herein incorporated by reference in its entirety. In implementations, articles unable to be folded or not requiring folding comprise articles comprising at least one of a threshold stiffness, a lack of symmetry, and being of an identified type of article not requiring folding. Such articles comprise, for example, at least one of undergarments and socks. In implementations, the laundry articles are unfolded household laundry articles of more than one article type and size. In implementations, the unfolded household laundry articles comprise at least one of socks, undergarments, gloves, hats, swimsuits, and baby clothes. The articles can be detected by a plurality of sensors disposed about the separating and sorting robot 3000 and a controller 3005 is configured to receive the sensor signals and determine one or more characteristics of the laundry article size and type. In implementations, the controller 3005 is configured to analyze sensor signals with a Neural Network to identify and batch items having characteristics suitable for washing and sending to the bypass robot 1000 in an unfolded state.

Returning now to the system of FIGS. 4B and 4C, once the container 7800 receives the plurality of unfolded laundry articles 7300a-n from the bin tipper 1600 and funnel 1694, the container 7800 transits from a staging conveyor 1590 beneath the bin tipper 1600 and funnel 1694 in the direction of arrow R-F to a flattening station at the movable surface 1700, which can comprise a substantially planar table surface or a roller surface as previously described with regard to implementations. In implementations, the drive motor 1750 is configured to rotate the at least one of the conveyor belt or chain and driven rollers of the movable surface 1700, and the container 7800 disposed thereon rapidly back and forth repeatedly until the maximum height variation of the plurality of unfolded laundry articles 7300a-n therein falls within a threshold range (e.g., a range of between about 0 cm to 3 cm after compression by at least one plunger 1795*a-b* or in implementations not having at least one plunger 1795*a-b*, e.g., a range of between about 0-10 cm prior to compression by at least one plunger 1795*a-b*) as detected by the at least one sensor 1765 as previously described. Additionally or alternatively, at least one actuator is configured to at least one of, simultaneously or in sequence one or more times, shake, oscillate, tilt, shushle (e.g. at least two of shaking, tipping, oscillating back and forth, and tipping simultaneously or in sequence one or more times), and vibrate the container 7800 (e.g., with a vibrational motor contacting the container 7800 and/or the movable surface 1700) and contents therein. In implementations, the threshold range of maximum height variation of the plurality of unfolded laundry articles 7300*a-n* disposed within the container 7800 comprises between about 0 to 3 cm of height variation between the tallest peak in the container 7800 to the lowest valley across the surface of the plurality of unfolded laundry articles 7300*a-n*. (In implementations of the system comprising at least one plunger, the threshold range prior to plunging comprises a range of 0-10 cm.) Additionally or alternatively, the rotational motor 1745 and one or more cam and follower assemblies 1755*a-b* are configured to impart motion, movement, and/or vibration to the contents of the container 7800 until the maximum height variation of the plurality of unfolded laundry articles 7300*a-n* therein falls within a threshold range as detected by the at least one sensor 1765. Additionally or alternatively, in implementations, the at least one controller 1005 is configured to instruct at least one actuator to at least one of shake, tilt, vibrate, oscillate back and forth, and shushle the container 7800 for a set duration of time (e.g., in a range of between about 5-15 seconds, e.g., 30 seconds, 1 minute, 2 minutes, 3 minutes) to ensure the plurality of unfolded laundry articles collectively comprise a level top surface 7303. Additionally or alternatively, the at least one controller 1005, 8005, 205 is configured to iteratively instruct at least one actuator to at least one of shake, tilt, vibrate, oscillate back and forth, and shushle the container 7800 until the maximum height variation falls between a threshold range of 0-10 cm prior to plunging and 0-3 cm in implementations without the compression provided by at least one plunger.

Additionally or alternatively, as shown in FIGS. 7A-D, the system further comprises selectively raised and retracted vertical walls 1760*a-b* on either end of the movable surface 1700 (FIGS. 7A-C). In implementations, the vertical walls 1760*a-b* are in operative communication with the at least one controller 1005, 8005, 2005 for raising and lowering autonomously under instruction from the at least one controller 1005, 8005, 205. In implementations, the vertical walls 1760*a-b* raise upon the detection of the presence of a container 7800 on the movable surface 1700. In implementations, the container 7800 can be detected using a force sensor disposed on the movable surface 1700 or an optical sensor such as a break beam positioned above and aimed across the movable surface to detect the presence of a container 7800 thereon. Additionally or alternatively, the at least one sensor 1765 can detect a container 7800 and output a signal to the at least one controller indicative of the presence of the container 7800.

The vertical walls 176*a-b*, when raised, provide a hard stop for the container 7800 moving back and forth on the movable surface (FIGS. 7B-7C) in opposite directions as indicated by arrows BF and BR. In implementations, the container 7800 is at least one of a rigid box comprising (e.g., example polyethylene) and semi-rigid box (e.g., thermoplastic Polyurethane (TPU) covered Ethylene-Vinyl Acetate (EVA) foam core or TPU covered ABS plastic) such that the container does not collapse upon impact and such that the impact forces transfer directly to the plurality of unfolded laundry articles 7300*a-n* therein rather than being absorbed by flexible sidewalls. Impacting the walls 1760*a-b* as a hard stops causes the plurality of unfolded laundry articles 7300*a-n* to shift first one way and then the other inside the container 7800. This alternating application of force flattens any peaks in the mounded plurality of unfolded laundry articles 7300*a-b* and fills in any valleys to create a more level top surface top surface 7303 of the collective mass of the plurality of unfolded laundry articles 7300*a-n*. For example, the laundry articles 7300*a-n* can form a pyramid such as that in shown in FIG. 7A following receipt of the laundry articles 7300*a-n* from an overhead bin tipper 1600 and funnel 1695. The moving conveyor belt or driven rollers of the movable surface 1700 move the container 7800 from side-to-side causing a collision with the walls 1760*a-b* and leveling the contents so that the pyramid is redistributed.

Figure 16A:
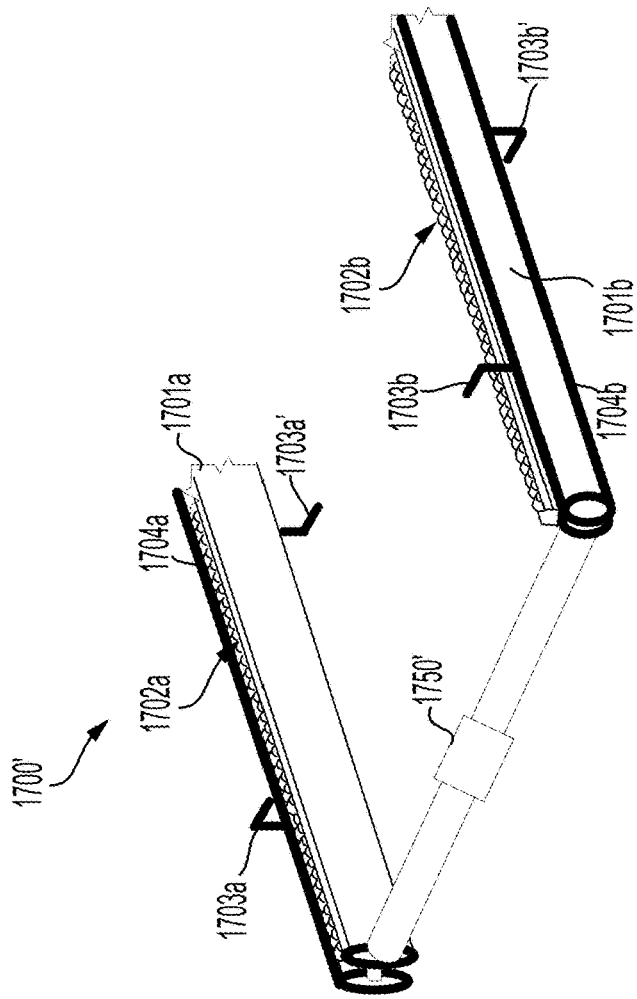
FIG. 16A depicts an example of a movable surface comprising a pair of passible roller rails and driven pusher bars.

As previously described with regard to implementations, the raised and retracted vertical walls 1760*a-b* are configured raise and lower adjacent ends of the movable surface 1700 (FIGS. 7A-C). Additionally or alternatively, the vertical walls 1760*a-b* are configured raise and lower in the unoccupied gaps between rollers of a roller conveyor (FIG. 16B) or inbound within a pair of spaced apart chain driven pusher and passive roller rails (FIG. 16A). Additionally or alternatively, the vertical walls are configured to raise and lower from a fixture disposed above the movable surface 1700. Additionally or alternatively, instead of vertical walls, the system comprises a pair of rotating arms that lower and raise to a resting position astride both ends of the container 7800, like train track crossing gates. Additionally or alternatively, instead of vertical walls, the system comprises a pair of horizontally extending arms or poles that extend horizontally from a fixture disposed adjacent the movable surface to a resting position astride both ends of the container 7800. Additionally or alternatively, instead of vertical walls, the system comprises a pair of load stopping cylinders disposed one at each end of the container to hold the container in place and/or to bang the container in a side-to-side motion with abrupt stopping. Additionally or alternatively, instead of vertical walls, the system comprises a plurality of load stopping cylinders configured to extend and bang the container 7800 from each side as the container 7800 transits down a conveyor to the packing station 8000. Additionally or alternatively, instead of vertical walls, the system comprises one or more pushers configured to bang the container 7800 into a stationary wall to impart force to the contents therein and flatten out any mounds (e.g., peaks) of unfolded laundry articles.

Once the peaks and valleys of the surface of the mass comprised of the plurality of laundry articles 7300*a-n* are within a delta that satisfies the threshold acceptable variation, the at least one plunger 1795*a-b* descends in the direction of arrow P to contact, compress, and further flatten the one or more laundry articles 7300*a-n*. Alternatively, the at least one plunger 1795*a-b* is configured to compress and level out the plurality of unfolded laundry articles prior to the collision sequence or as an alternative to the collision sequence. Additionally or alternatively, compressing the plurality of unfolded laundry articles 7300*a-n* occurs after at least one of shaking, oscillating, tipping, shushling, and/or vibrating the contents within the container 7800 to flatten any mounds of laundry articles 7300*a-n*. In addition to further flattening and leveling the mass comprising the plurality of unfolded laundry articles 7300*a-n*, the force applied by the at least one plunger 1795*a-b* compacts the plurality of unfolded laundry articles 7300*a-n* within the container 7800, creating a maximum unoccupied volume for receiving at least one folded laundry article within the container and/or enabling facile closure of a the container to conceal the contents from contaminants and prevent the contents from falling out.

Additionally or alternatively, in implementations, the at least one plunger 1795*a-b* is further configured to oscillate and impart oscillation to the plurality of unfolded articles to flatten a pyramid or other unevenly distributed peaks of laundry articles 7300*a-n*. Additionally or alternatively, the system 1000 further comprises an overhead distributor (not shown) configured to lower into the container 7800 and rake the received plurality of unfolded articles 7300*a-n* flat prior to the plunger compressing the articles 7300*a-n*. In implementations, the overhead distributor comprises a heavy flap configured to slide across the plurality of unfolded laundry articles and topple any peaks in the distribution. In implementations, the heavy flap is configured to move across the container 7800 in one direction and reverse direction to move across the container 7800 again, cycling between directions one or more times. In implementations, the heavy flap comprises at least one of a rubber, neoprene, and EVA material. In implementations, the heavy flap hangs from a fixture above the movable surface and the container 7800 is moved back and forth beneath the flap.

As previously mentioned, additionally or alternatively, the system includes one or more stirring devices or other mechanical agitation devices configured to be actuated inside the container 7800 for redistributing the plurality of unfolded laundry articles 7300*a-b* therein to a collectively leveled configuration. Additionally or alternatively, in implementations, a staging conveyor 1590 beneath the bin tipper 1600 and funnel 1695 can be disposed on at least one of a shake table and an eccentric turntable for shaking, oscillating, tipping, shushling, and/or vibrating the contents within the container 7800 to flatten any mounds of laundry articles 7300*a-n* to more uniform (e.g., level) surface height distribution. Additionally or alternatively, the staging conveyor 1590 beneath the bin tipper 1600 and funnel 1695 can impart motion to the container 7800 while the bin tipper 1600 provides the plurality of unfolded laundry articles 7300*a-n* to the container 7800 to more efficiently produce in an even height distribution. In implementations, this motion at the staging conveyor 1590 can be applied to the container 4800 instead of or in addition to motion provided at the movable surface 1700.

As described with regard to FIGS. 4A-C, at least one sensor 1765 is configured to detect container fill heights along a top surface top surface 7303 of the plurality of unfolded laundry articles disposed within the container 7800. In implementations, the at least one sensor 1765 is configured to detect container fill heights without compression of the unfolded laundry articles by at least one plunger 1795*a-b*. Alternatively, the at least one sensor 1765 is configured to detect container fill heights only after compression of the unfolded laundry articles by at least one plunger 1795*a-b*. In implementations, the at least one sensor 1765 comprises at least one optical sensor disposed at a fixed height HS1 above the top rim of the container, and therefore at a fixed HS2 height above the movable surface 1700. The at least one optical sensor comprises at least one of a 3-D camera an IR sensor, a 2-D camera, LIDAR, LADAR, a sonar proximity sensor, an ultrasonic ranging sensor, a radar sensor, a laser sensor, and a pair of stereo depth cameras. Because the container 7800 comprises a known container height HC height from the inside bottom surface to a top rim and because the at least one sensor 1765 is disposed at a known fixed height HS2 above the movable surface 1700 (approximately at the height of the inside bottom surface of the container 7800 but for a wall thickness of the bottom of the container), the at least one sensor 1765 can determine the remaining unoccupied height and/or volume in the interior 7805 container 7800 of known, fixed dimensions and volume and communicate this to the packing robot 8000. The packing robot 8000 can then determine which one or more folded laundry articles 7301*a-n* and/or stacks 7302*a-n* of folded articles 7301*a-n* will fit in the unoccupied volume in the interior 7805 of the container 7800. The packing robot 8000 can then intelligently stack and sort one or more folded laundry articles 7301*a-n* for loading into the container 7800 atop the plurality of unfolded articles 7300*a-n*.

Additionally or alternatively, the at least one sensor configured to determine a height of the plurality of unfolded laundry articles 7300*a-n* from at least one of the bottom of the container 7800 and the movable surface 1700 is disposed on the at least one plunger 1795*a-b*. In implementations, the at least one sensor comprises at least one load cell (not shown) disposed on the at least one plunger 1795*a-b*, the at least one load cell being configured to detect when the at least one plunger 1795*a-b* has reached a threshold compression force indicative of the plurality of unfolded laundry articles 7300*a-n* being compressed. Because the at least one plunger 1795*a-b* is suspended at fixed height HP1 (FIG. 4C) above the container 7800 and a fixed height HF (e.g., a maximum distance for double arrow HP2) above the movable surface 1700, outputting a detected (or measured) distance traveled along double arrow HP2 by the extending at least one plunger 1795*a-b* from the starting height HF enables the at least one controller 1005, 8005, 205 to determine the compressed, flattened height of the plurality of unfolded laundry articles disposed within the container 7800 relative to a known depth position of a container bottom surface. The at least one sensor is configured to output a signal indicative of the height of the plurality of unfolded laundry articles 7300*a-b* to the at least one controller 1005, 8005, 205.

Additionally or alternatively, in implementations, at least one sensor comprises an absolute position sensor disposed on the at least one plunger 1795*a-b* driven by a motor 1715 and an additional sensor disposed on or adjacent to the piston 1796*a-b* configured to extend the at least one plunger. The absolute position sensor and additional sensor are configured to detect a distance traveled by the plunger to a final compression height of the plurality of unfolded laundry articles and provide to the at least one controller 1005, 8005, 205 a signal indicative of the distance traveled by the at least one plunger 1795*a-n*. In implementations, the position sensor comprises a magnetic encoder disposed on the drive motor 7515 of the at least one plunger 1795*a-b*. The at least one controller 1005, 8005, 205 is configured to, based on the received signal, determine the height of the plurality of unfolded laundry articles 7300*a-n* within the container 7800. Because the container 7800 has a known height HC from the bottom to the container rim 7801 around the opening, a plunger length of travel can be determined, and the height of the laundry articles 7300*a-n* calculated as a travel length of the at least one plunger 1795*a-b* relative to the known container height HC. Additionally or alternatively, a distance sensor (e.g., one or more lasers, one or more photo electric distance sensors, one or more optical or ultrasonic range sensors, and one or more depth cameras (e.g., REALSENSE depth camera)) mounted above the at least one plunger

1795*a-b* is configured to measure the height of the at least one plunger 1795*a-b* and/or the height of the plurality of laundry articles 7300*a-n* disposed within the container 7800. In implementations, a plunger compression force comprises a range of between about 0.25 lbf to 10 lbf. In implementations, such as that of FIGS. 4A-4C and 7, the at least one plunger comprises two side-by-side plungers 1795*a-b* configured to substantially cover the top surface top surface 7303 of the plurality of unfolded laundry articles 7300*a-n* disposed in the container 7800. Alternatively, the at least one plunger comprises a single plunger 1795 positioned at least above a center (e.g., typical high point) of the received plurality of unfolded laundry articles 7300*a-n*. In implementations, the single plunger plate 1797 is configured to cover substantially all of the top surface top surface 7303 of the plurality of unfolded laundry articles for evenly flattening and leveling the entire top surface of the plurality of unfolded laundry articles 7300*a-n*. Alternatively, in implementation, the one or more plungers 1795, 1795*a-b* are optional and the movable surface 1700 is disposed directly beneath the funnel 1695 of the bin tipper 1600.

Additionally or alternatively, in implementations, a plate 1797*a-b* of the at least one plunger 1995*a-b* comprises a compliant surface therebeneath for accommodating the mass of unfolded laundry articles 7300*a-n* having an uneven height. In implementations, the plate comprises a thin rigid material, such as metal or plastic, that is about ⅛" to ½" thick (e.g., 3 mm to 12 mm) and the complaint contact surface therebeneath comprises a compliant material such as a foam layer making the overall combined height of the plate 1797*a-b* and plunger 1796*a-b* between about ⅛" to 5" (e.g., 3 mm to 12 cm) deep in a vertical direction.

As previously described, once the at least one sensor detects a height of the plurality of unfolded laundry articles 7300*a-b*, the at least one controller 1005, 8005, 205 determines a remaining unfilled height and/or volume in the interior 7805 within the container 7800. The packing robot 8000 is configured to queue one or more folded laundry articles 7301*a-n* and/or stacks 7302*a-n* of two or more folded laundry articles 7301*a-n* for loading into the container 7800 atop the redistributed, leveled, flattened, and optionally compressed unfolded laundry articles 7300*a-n*.

For example, FIGS. 8A-10 depict implementations of a packing robot 8000 including a queue conveyor 8200*a-b* and refillable cartridge 8100 configured to load folded laundry articles 7301*a-n* and stacks 7302*a-g* of folded laundry articles into the container 7800. The refillable cartridge 8100 is configured to receive automatically at least one unbound folded laundry article 7301*a-n* or one or more stacks 7302*a-n* of two or more folded laundry articles 7301*a-n* for transfer into a container 7800. As shown in the perspective view of FIG. 8A and the cut away view of FIG. 8B, the refillable cartridge 8100 is configured to load one or more stacks 7302*a-n* of folded laundry articles 7301*a-n* and/or single folded laundry articles 7301*a-n* atop flattened, compressed unfolded laundry articles disposed in the bottom of the container 7800. In the schematic of FIG. 8B, a stack 7302*a* and a single large, folded article 7301*b* are disposed within the refillable cartridge 8100 in a side-by-side orientation for loading atop a plurality of unfolded laundry articles 7300*a-n* in the container 7800 positioned therebelow. In implementations, the container 7800 transits from the conveyor 1650 of the bin tipper 1600 to a conveyor 8580 of the packing robot 8000 for automated positioning and alignment beneath the refillable cartridge 8100. In implementations, the bin tipper conveyor 1650 and packing conveyor 8580 comprise portions of a continuous conveyor. In implementations, the bin tipper conveyor 1650 and packing conveyor 8580 are disposed end to end for seamless transit of the container 7800. In implementations, the bin tipper conveyor 1650 and packing conveyor 8580 are connected by a turntable conveyor (not shown) for rotating the container 7800 for alignment with the receiving conveyor (e.g., a handoff from the bin tipper conveyor 1650 to the receiving packing conveyor 8580).

In implementations, a stack 7302*a-n* can comprise one or more folded laundry articles 7301*a-n* stacked vertically atop one another. In implementations, the refillable cartridge 8100 comprises a pair of opposing sidewalls 8110*a-b* and a back wall 8115 spanning between the pair of opposing sidewalls 8110*a-b*. In implementations, the pair of opposing sidewalls 8110*a-b* and the back wall 8115 are rigid so that the folded laundry received by the refillable cartridge 8100 is provided with support to keep from toppling and/or unfolding during loading into the refillable cartridge 8100 and unloading from the refillable cartridge 8100 into the container 7800. The pair of opposing sidewalls 8110*a-b* and back wall 8115 can be manufactured of any lightweight, resilient rigid material such as one or more of metal, wood, and plastic. The refillable cartridge 8100 comprises an opening 8120 opposite the back wall 8115. The opening 8120 is configured to receive the at least one unbound folded laundry article 7301*a-n* therethrough. The at least one unbound folded laundry article 7301*a-n* is a folded laundry article that is not wrapped, sealed, restrained, or fastened in any way. The at least one unbound folded laundry article 7301 is folded by a folding robot 7000 and delivered to the queue conveyor for packing without being held in a folded state by any shrink wrapping or plastic ties or other restraint wrapped around or otherwise constraining the folded laundry article 7301 or stack 7302 of folded laundry articles 7301*a-n*. Eliminating such ties and wraps reduces waste and environmental damage caused by such waste and facilitates quickly unloading the folded container contents into a dresser drawer or closet upon return to a customer.

In addition to the two opposing sidewalls 8110*a-b* and the back wall 8115, in implementations, the refillable cartridge 8100 further comprises a removable receiving surface 8130 configured to span, in a closed position, between a bottom edge of each one of the pair of opposing sidewalls 8110*a-b* and the back wall 8115. The removable receiving surface 8130 is configured to receive thereon the at least one folded laundry article 7301*a-n* or at least one stack 7302*a-n* in a closed position in which the receiving surface 8130 extends across the bottom opening of the refillable cartridge 8100 to create a selectively sealed floor. The removable receiving surface 8130 moves from the closed position to an open position in which the bottom opening of the refillable cartridge 8100 is exposed so that the received at least one folded laundry article 7301*a-n* or stack at least one stack 7302*a-n* falls through the opening into a receiving container 7800 disposed therebeneath. Returning to FIG. 3, the refillable cartridge 8100 further comprises at least one drive 8135 in communication with the controller 8005 for instructing a drive motor 8151 moving the removable receiving surface 8130 from the closed position to an open position.

Figure 9:
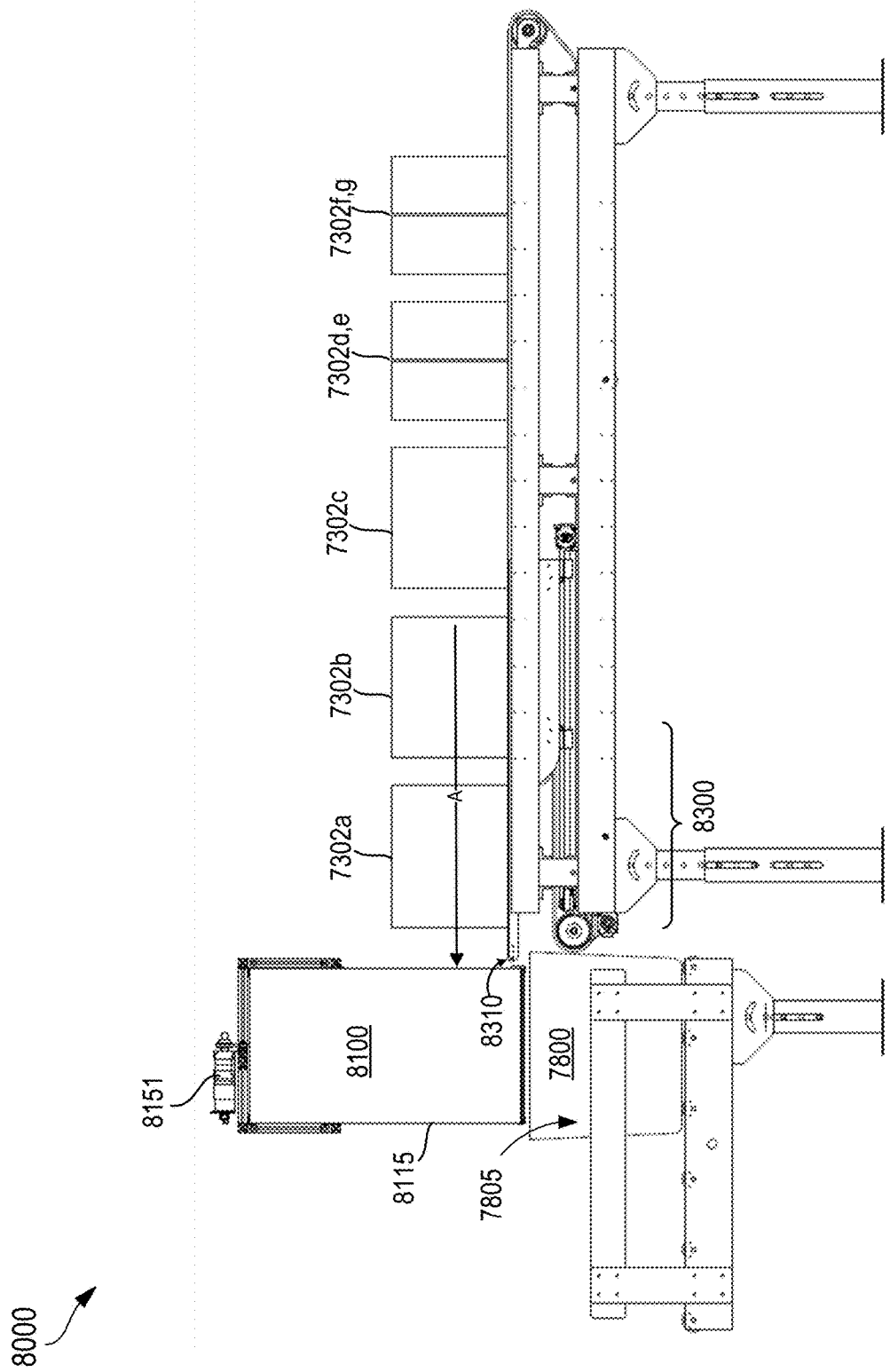
FIG. 9 depicts a schematic example of a system for packing unbound folded household laundry articles into a shipping container.
Figure 10:
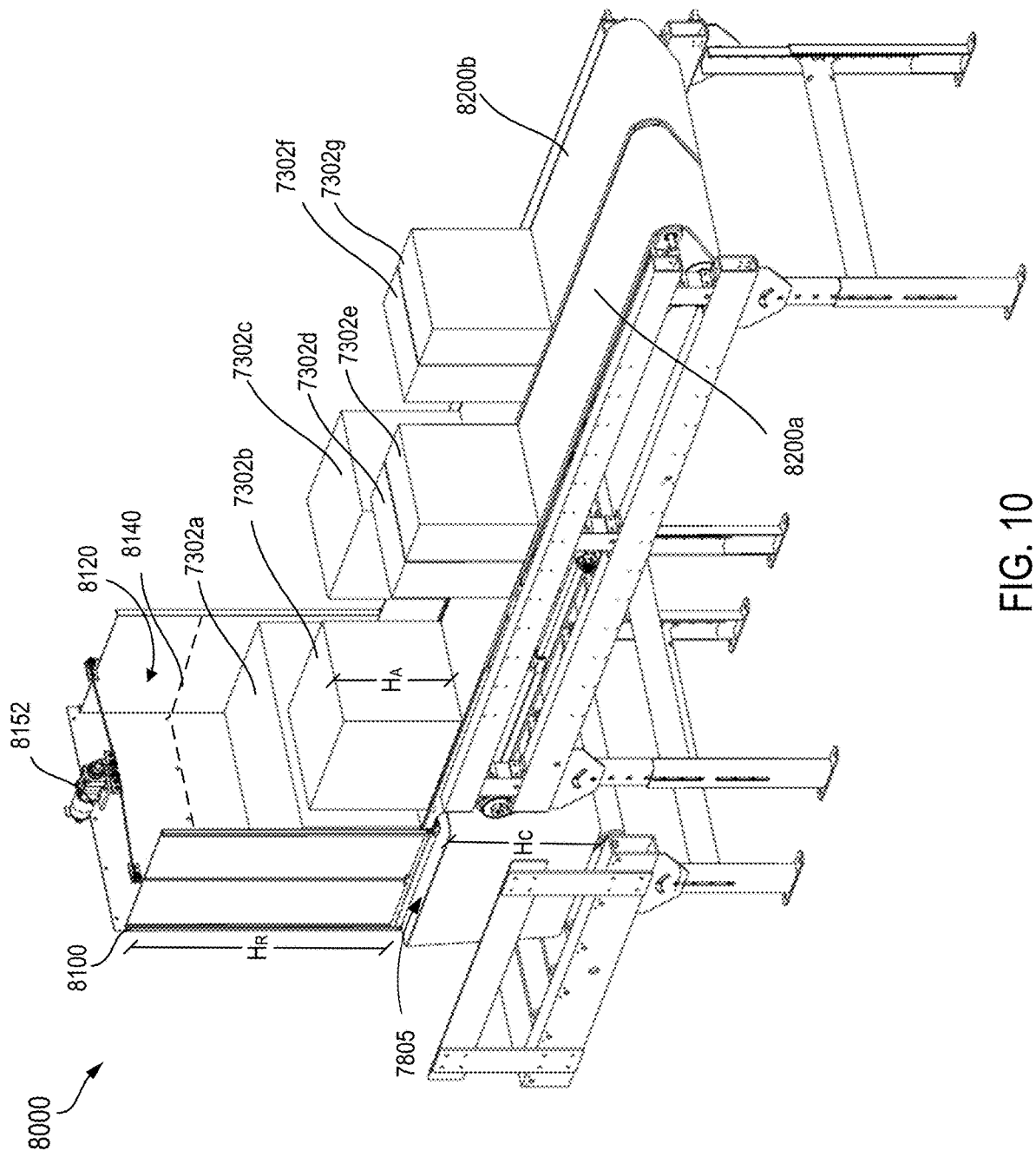
FIG. 10 depicts a perspective view of the example system of FIG. 9 loaded with unbound folded laundry articles queued for packing.

In implementations, a controller 8005 is in operable communication with the at least one drive 8135 via a wired or wireless communication network (e.g., network 230). In implementations, the controller comprises at least one of a centralized controller 8005 configured to communicate with one or more devices of the system 8000 and a processor 8105, 8205, 8305, 8405, 8505 of one or more of the devices 8100-8500 of the system 8000. In implementations, as shown in FIGS. 9-10, the at least one folded laundry article 7301*a-n* and/or stacks 7302*a-n* of folded laundry articles awaiting loading into the container 7800 comprises a plurality of folded laundry articles queued on the queue conveyor 8200. In implementations, the plurality of folded laundry articles 7301*a-n* are queued on the queue conveyor in an intelligent (e.g., pre-determined) order by stack height such that as the plurality of folded laundry articles 7301*a-n* and/or stacks 7302*a-n* of two or more folded articles 7301*a-n* are loaded into the cartridge 8100 the sum total of all of the articles does not exceed at least one of a threshold height 8140 of the cartridge and a remaining, unoccupied volume in the in the interior 7805 of the container 7800. Additionally or alternatively, in implementations, one containers-worth of stacks 7302*a-n* are queued at a single time and the one or more articles are stacked intelligently according to at least one of article type, size, and folded article orientation. A full container's worth of folded laundry articles 7301*a-n* can be pre-queued on the queue conveyor 8200 and then queued in single folded articles 7301*a-n* and/or stacks 7302*a-n* before being loaded into the refillable cartridge. FIG. 10 depicts an implementation of the refillable cartridge 8100 with a portion of the walls removed to reveal a stack 7301*a* disposed within the refillable cartridge 8100 and not exceeding a threshold height 8140 indicated by dashed lines.

Returning now to FIGS. 8A to 8B, a movable lifter 8500 is configured to raise and lower the refillable cartridge 8100 for loading from the queue conveyor 8200 and loading into the container 7800. The movable lifter 8500 lowers the refillable cartridge such that at least one of the removable receiving surface 8130 and a top surface of an unbound folded laundry article 7301 received within the refillable cartridge 8100 is positioned below a bottom surface of the at least one conveyor loading end 8300 prior to loading another unbound folded laundry article 7301 or stack 7302 of two or more unbound folded laundry articles 7301*a-n* into the refillable cartridge 8100. In implementations, the at least one of the receiving surface 8130 and the top surface top surface 7303 of the plurality of unbound folded laundry articles 7301*a-n* received within the refillable cartridge is configured to be positioned below a bottom surface of the at least one conveyor 8300 by a distance in a range of between about 1 mm to 100 mm prior to loading. In implementations, the controller 8005 identifies which folded articles 7301*a-n* or stacks 7302*a-n* of two or more unbound folded laundry articles 7301*a-n* will be loaded into the refillable cartridge 8100 based on the height and/or volume of each stack on the conveyor and whether the remaining unoccupied volume in the interior 7805 of the container 7800 can accommodate each stack or some combination of folded articles 7301*a-n* and stacks 7302*a-n* on the queue conveyor without exceeding a maximum fill height of the container 7800.

Turning now to the introduction of the unfolded laundry articles 7300*a-n* into the container 7800, the container is fed by an autonomous bin tipper 1600 disposed above an empty container 7800. The controller 1005 is configured to actuate the bin tipper 1600 to release the one or more unfolded laundry articles 7300*a-b* into the shipping container 7800. In implementations, the bin tipper 1600 comprises an outer frame 1655, a stand 1657, a box frame 1660 configured to be to rotatably disposed within the bin tipper 1600, two or more chain plates 1665*a-c* configured to be fixedly attached to the box frame 1660, one or more selectively actuated clamps 1670*a-b*, and wheels 1672*a-d*, *a'-d'*, 1674*a-b* disposed on the box frame 1660 and extending outward for engaging and rotating along the outer frame 1655. In implementations, the bin tipper 1600 comprises an autonomous conveyor 1650 configured to transit the bin 20 from a delivery conveyor 1500 from an autonomous washing and drying robot 4000, a cleaning laundry separating robot 5000, or a spreading robot 6000 to the bin tipper 1600. Although in FIG. 4A the conveyor 1500 is shown feeding the bin tipper 1600 from a side, in implementations, the conveyor 1500 delivering the bin 20 containing a plurality of unfolded laundry articles 7300*a-n* instead feeds the bin 20 through an end opening 1601 (FIG. 13) of the bin tipper 1600, in the same direction of rotation C of the autonomous conveyor 1650.

As depicted in FIGS. 11-14B, the bin tipper 1600 further comprises a conveyor 1650 on which the bin 20 transits into the box frame 1660 to be held along its sides by one or more selectively actuated side clamps 1670*a-b*. In implementations the one or more selectively actuated clamps 1670*a-b* comprise a pneumatically operated clamp 1670*a* in operable communication with the controller 1005 and a stationary receiving clamp 1670*b* against which the bin 20 is held. As shown in sequential depiction in FIGS. 11 and 14A-B with the bin 20 clamped into the box frame 1660, the at least one controller 1005, 8005, 205 rotates the outer frame 1655 in the direction of arrow Y to empty the bin 20, ejecting the plurality of unfolded laundry articles 7300*a-n* through the funnel 1695 in the direction of arrow D and into the container 7800. After at least one of a set period of time and receiving a signal from an optical sensor configured to detect contents within the overturned bin 20, the at least one controller 1005, 8005, 205 (e.g., bypass robot controller 1005) determines the bin 20 is empty and instructs the drive of the bin tipper 1600 to rotate the bin 20 back in the direction of arrow Y' to return the bin 20 to an upright position for cleaning and/or refilling at one of the clean laundry robots 4000, 5000, 6000, 7000, 8000. If the controller 1005 determines one or more unfolded articles 7300*a-n* remain in the bin 20, the controller 1005 is configured to iteratively rotate the bin 20 the directions Y, Y' until the sensor signal indicates no remaining articles within the bin 20. Additionally or alternatively, the controller 1005 is configured to push at least one of a text based, image based, vibrational, and audible alert to a screened device 245 (e.g., smart phone, tablet, smart watch, etc.) or computer terminal 205 manned by a human operator to clear the contents of the bin 20, identifying the location (e.g., on a graphical map of the facility) of the bin 20 within a facility containing a plurality of bins 20*a-n*.

The outer frame 1655 is seated on a plurality of guide wheels 1672*a-d*, *a'-d'*, 1674*a-b* configured to ride on inner and outer races (e.g., surfaces 1667*a-a'*, 1667*b-b'*) of the outer frame 1655, flipping the bin 20 upside down with its opening defined by the upper rim 21 facing the funnel 1695 therebeneath. In implementations, the conveyor 1650 is disposed at the bottom of the box frame 1660. In implementations, the conveyor comprises at least one of a belt conveyor, spaced apart chain driven pusher and passive roller rail pairs (e.g., FIG. 16A), and a plurality of driven rollers 1651*a-d* configured to rotate in a shared rotational direction C when the bin 20 enters and exits the bin tipper 1600. As previously described with regard to the roller implementation of the conveyor 1650 of FIG. 13, the plurality of rollers 1651*a-d* are configured to be driven by a motor 1681. In implementations, the motor 1681 drives a single roller 1651*b* paired to the reaming rollers 1651*a, c-d* by one or more drive belts 1652 for transferring rotational motion and synchronizing movement of the plurality of rollers 1651*a-d*. In implementations, the motor 1681 is reversible and the plurality of rollers 15651a-d are configured to rotate first in the direction C and then in an opposite rotational direction to reverse the empty bin 20 out through the end opening 1601 of the outer frame 1655 through which the full bin 20 had entered before emptying.

Figure 13:
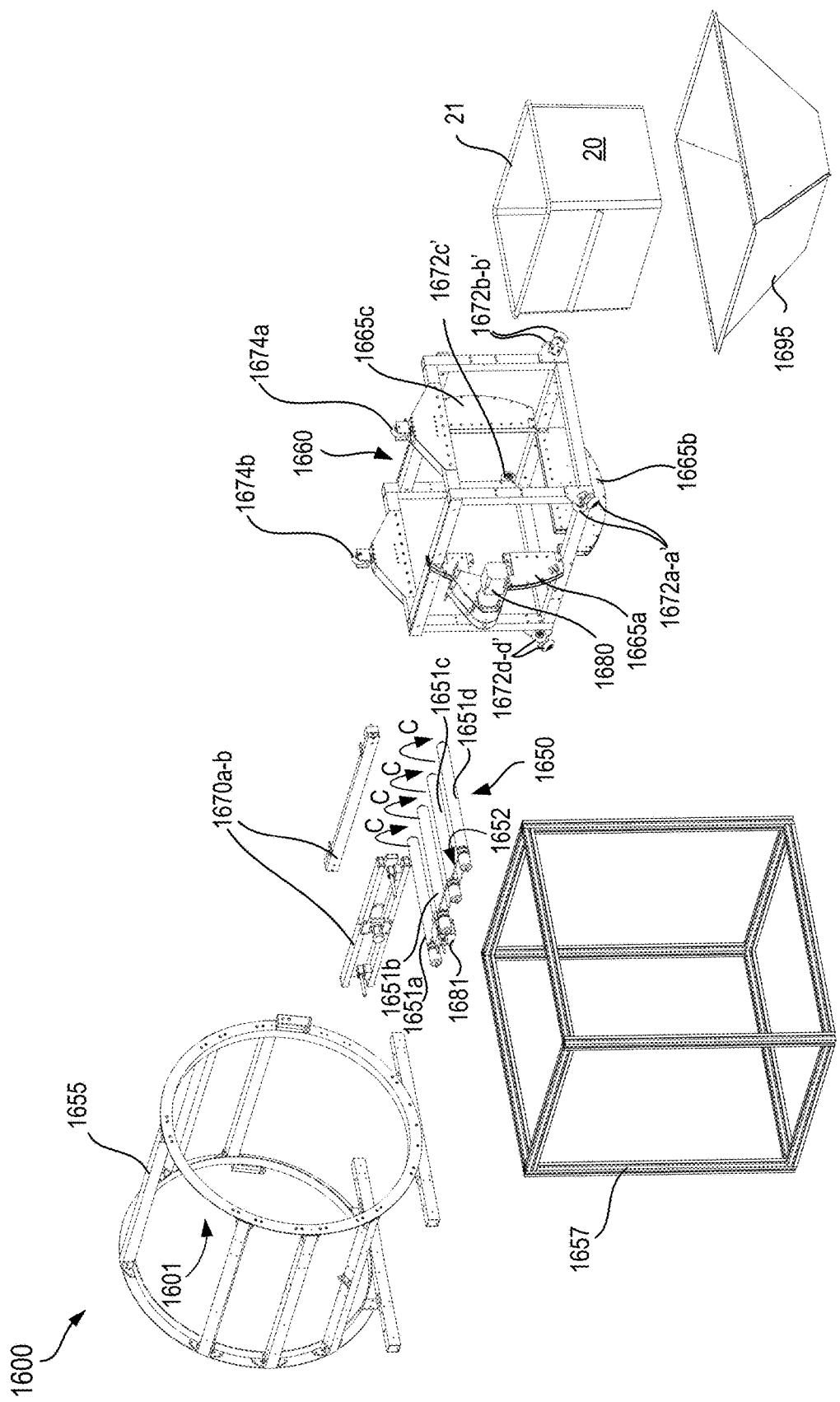
FIG. 13 depicts an exploded view of the autonomous dirty laundry bin tipper of FIGS. 11-12 relative to a bin.
Figure 14B:
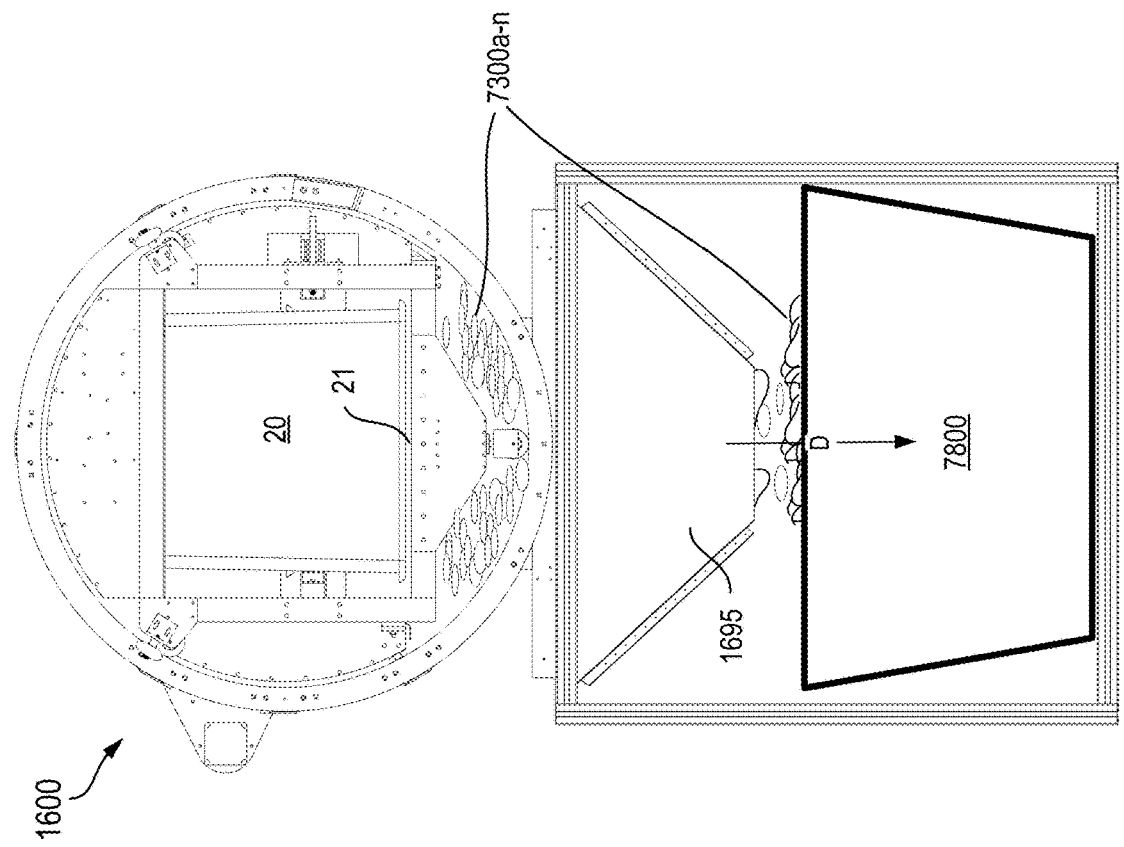
FIG. 14B depicts the autonomous dirty laundry bin tipper of FIG. 11 in a fully inverted rotational position.
Figure 14A:
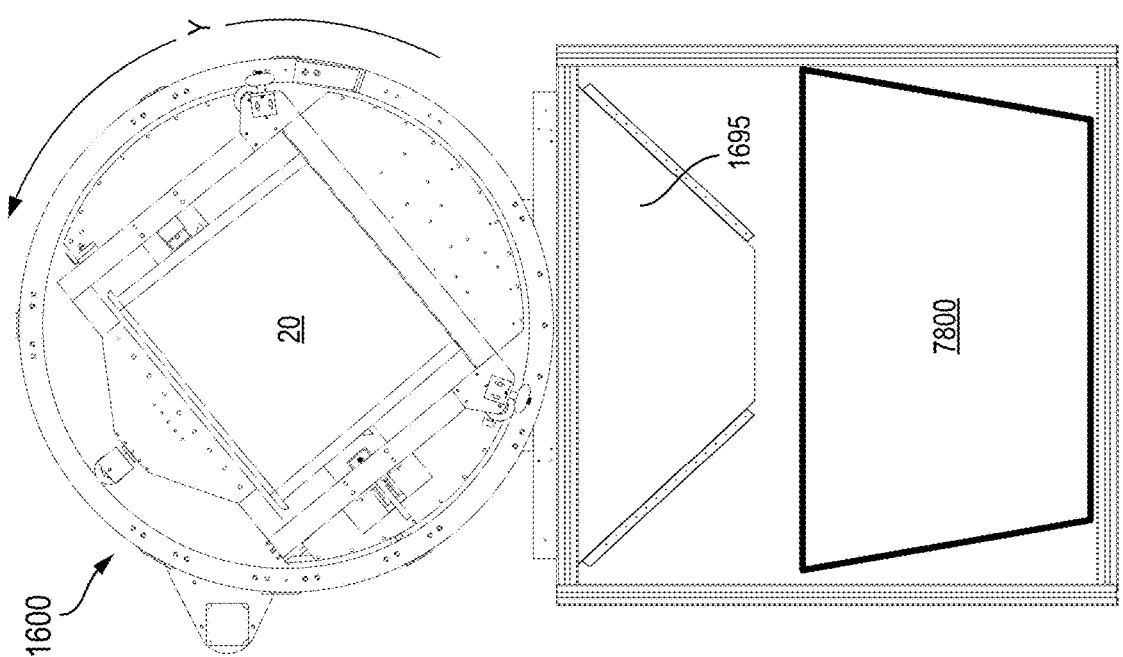
FIG. 14A depicts the autonomous dirty laundry bin tipper of FIG. 11 in a partially overturned rotational position.

Turning to the system schematic of FIG. 3 and the exploded view of an implementation of the bin tipper 1600 of FIG. 13, the bin tipper 1600 comprises a processor 1605 in wired or wireless communication with the at least one controller 1005, 8005, 205 via a network interface 1635. The bin tipper 1600 comprises a conveyor drive 1610 in operable communication with a reversible conveyor motor 1681 configured to receive a full bin 20 into the bin tipper 1600 and eject the bin 20 once emptied. In implementations, the conveyor 1650 further comprises an incremental shaft encoder 1630 on a conveyor motor 1681 configured to rotate the plurality conveyor rollers 1651a-d by a measurable amount to move a full bin 20 into a clamping positioning within the box frame 1660. Additionally or alternatively, the conveyor 1650 comprises at least one position sensor 1625 configured to detect a position of a bin 20 within the box frame 1660 and transmit a signal to the processor 1605 of the bin tipper 1600 to actuate the clamp 1670a to retain the bin 20 securely for rotating the bin 20 within the outer frame 1655 for emptying. The bin tipper 1600 further comprises a tumbler drive 1615 in operable communication with a drive motor 1680 configured to rotate the box frame 1660 to invert a bin 20 clamped therein. In implementations an incremental shaft encoder 1631 is disposed on the drive motor shaft of the drive motor 1680 for detecting a rotational position of the box frame 1660. Additionally, in implementations, the bin tipper 1600 comprises one or more rotation limit switches 1632 configured to detect at least one of the box frame 1660 (e.g., the "tumbler") being upturned with the rim 21 of a bin clamped therein being upright, vertically positioned above a bottom of the bin 20 and the being inverted with a rim of a bin 20 clamed therein being downturned, vertically positioned below a bottom of the bin 20.

Figure 11:
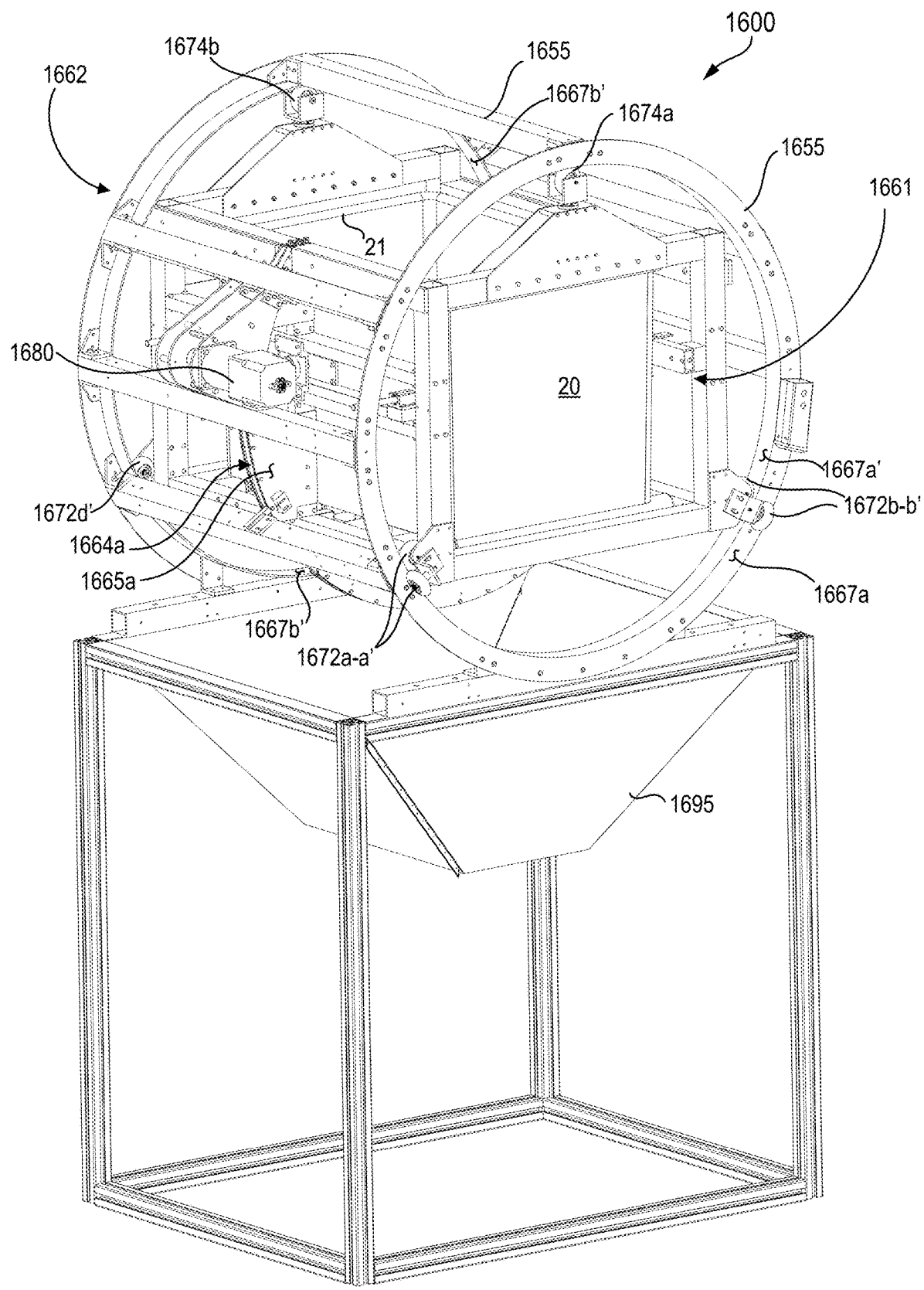
FIG. 11 depicts a perspective view example of an autonomous clean laundry bin tipper for loading unfolded laundry into a shipping container from a bin held therein through a funnel disposed therebeneath.
Figure 12:
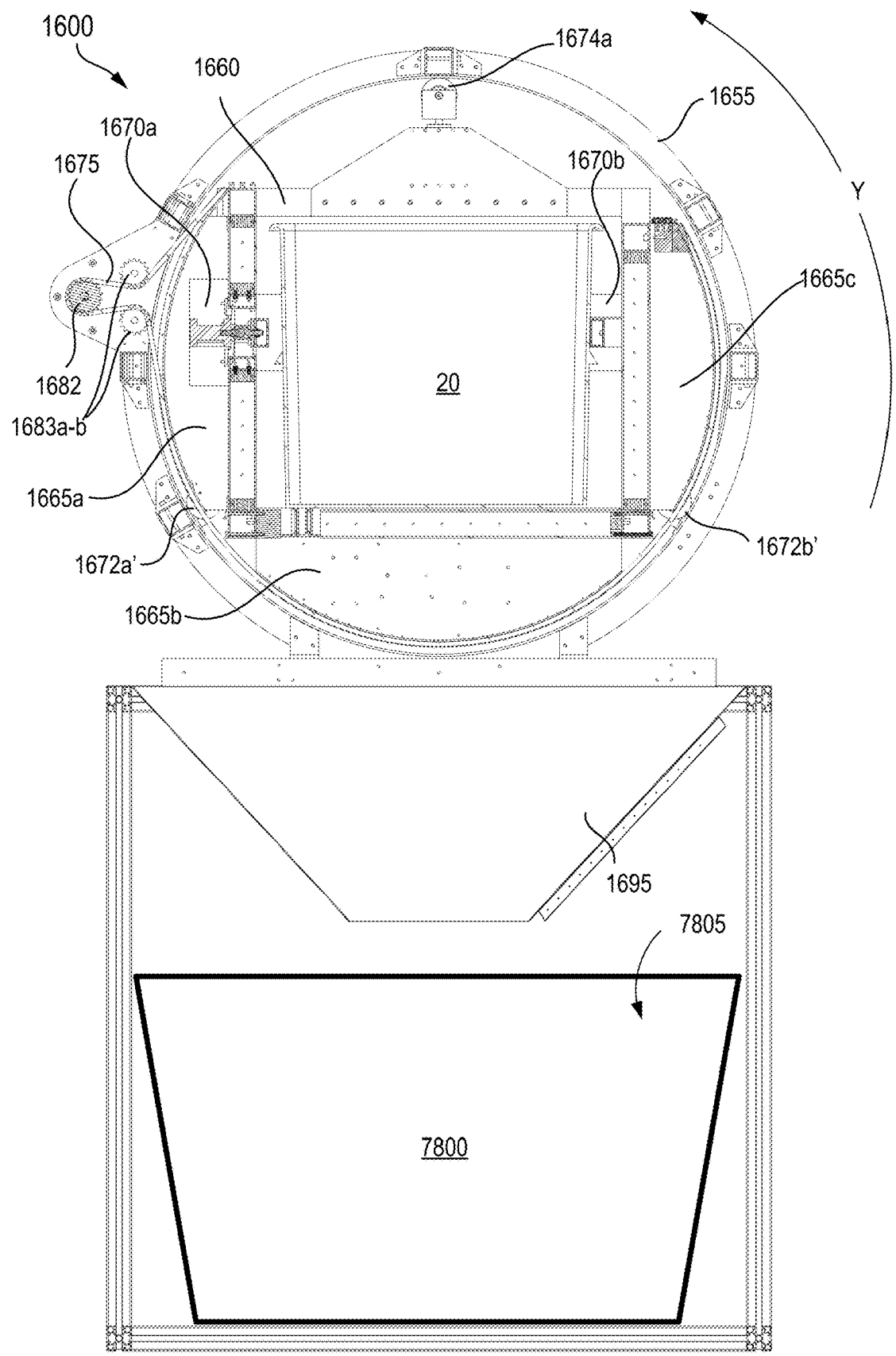
FIG. 12 depicts a front cut away view of the bin tipper and bin of FIG. 11, including an implementation of clamping and rotation mechanisms.

In implementations, as shown in particular in the front cross section view of the bin tipper 1600 in FIG. 12 and the exploded view of FIG. 13, rigid chain plates 1665a-c are fixedly attached (e.g., at least one of riveted, welded, glued, screwed, clamped, etc.) to the box frame 1660. A static chain 1675 is configured to wrap around and within channels disposed about the external edges of the rigid chain plates 1665a-c (e.g., channel 1664a of FIG. 11). The static chain 1675 is configured to engage with a motor sprocket 1682 driven by a shaft of the drive motor 1680. In implementations, the chain 1675 wraps around the driven sprocket 1682 and at least two idlers 1683a-b. In implementations, the bottom wheels 1672a-d, 1672a'-d' at the front 1661 and back 1662 of the box frame 1660 are fixed and the top wheels 1674a, 1674b are spring mounted to provide resistance that maintains the wheels 1672a-d, a'-d', 1674a-b securely in contact with the outer frame 1655 during rotation. As shown in FIG. 11, the bottom pairs of wheels 1672a-d, a'-d' are oriented such that one of each pair of wheels is configured to rotate along an outer end surface 1667a-b of the outer frame 1655 and the other along an inner surface 1667a'-b'. A front end outer surface 1667a and inner surface 1667a' are disposed at a front end 1661 of the outer frame 1655, and a rear end outer surface 1667b (not shown) and inner surface 1667b' are disposed at a back end 1662 of the outer frame 1655. The spring loaded top wheels 1674a-b also engage and ride along the inner surfaces 1667a', 1667b' respectively.

Figure 15:
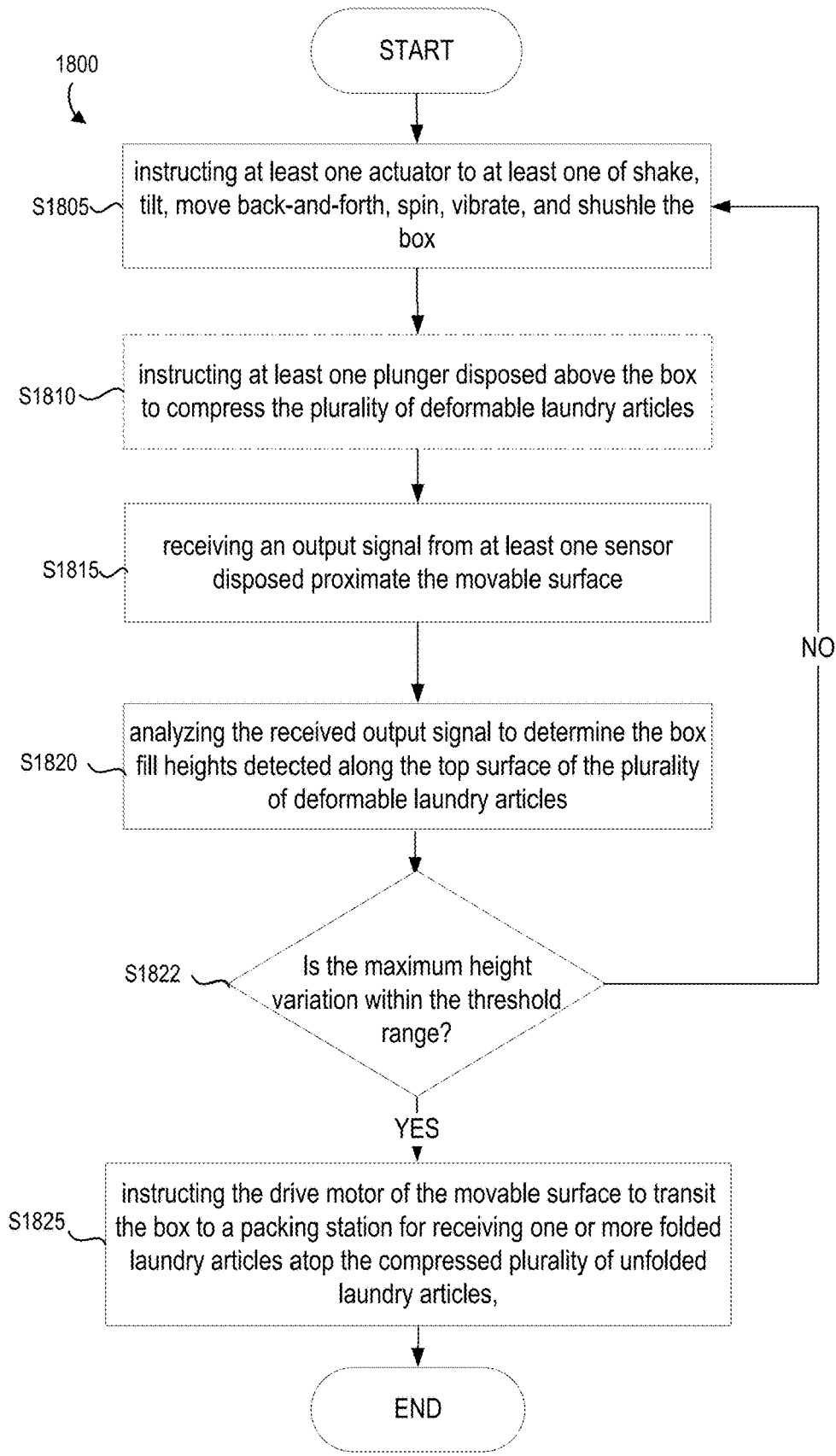
FIG. 15 depicts an example method of packing unfolded household laundry articles into a shipping container.

Referring now to FIG. 15, any of the examples and implementations described previously with regard to the unfolded laundry articles bypass system 1000 are applicable to implementations described herein with regard to a method 1800 of redistributing a plurality of unfolded deformable laundry articles 7300a-n received in a container 7800. The method 1800 is configured to be executed autonomously by one or more controllers 1005-8005, 205, and the one or more controllers are configured to be in operative communication with the one or more processors, sensors, and drives of the system 300 described with regard to all of the preceding implementations, including that of FIG. 3. In examples, the one or more controllers 1005-8005, 205 are configured to communicate with each device of the system 300 over a communication network 230 via at least one of wired and wireless communication protocols.

The method comprises instructing S1805 at least one actuator to at least one of shake, tilt, spin, vibrate, and shushle the container (e.g., a box). The at least one actuator being disposed on or adjacent a movable surface configured to receive the container thereon, the at least one actuator comprising at least one of a vibrational motor configured to impart vibration to the movable surface, a drive motor configured rotate at least one of a conveyor belt, a pusher chain, and driven roller(s), a cam and follower configured to raise and lower an end of the container, and a rotational motor configured to twist the movable surface about a vertical axis in one direction and/or alternating directions. In implementations, side clamps and/or one or more top down clamps (not shown) are configured to actuate and retain the container on the movable surface during spinning (e.g., twisting). In implementations, the method comprises instructing a clamp to clamp the container to the surface and release the container upon cessation of spinning.

The method optionally comprises instructing S1810 at least one plunger disposed above the container to compress the plurality of deformable laundry articles, the at least one plunger being operably connected to a piston. Alternatively, in implementations, the system comprises another drive mechanism to lower and raise the at least one plunger 1795, 1795a-b, such as linear drive motors, hydraulics, springs, etc. The method comprises receiving S1815 an output signal from at least one sensor disposed proximate the movable surface, the at least one sensor being configured to detect one or more container fill heights along a top surface 7303 of the plurality of deformable laundry articles. In implementations, the method comprises detecting a maximum fill height (e.g., detected by any of the distance sensors described herein with regard to implementations or a break beam sensor lowered into the container 7800) and a minimum fill height. The method comprises analyzing S1820 the received output signal to determine fill heights detected along the top surface 7303 of the plurality of deformable laundry articles, determining whether a maximum height variation falls within a threshold range (e.g., a range of between about 0 cm to 3 cm), and instructing 1825, based on an analysis indicative of the maximum height variation being within the threshold range, the drive motor of the movable surface to transit the container 7800 to a packing station (e.g., below the refillable cartridge 8100) for receiving one or more folded laundry articles 7301 atop the compressed plurality of unfolded laundry articles 7300a-n. Additionally or alternatively, the method comprises determining the container is filled such that no volume remains for the addition of one or more folded laundry articles 7301a-n. The controller is configured to determine this based on a level top surface 7303 being at or around a known maximum fill height of the container, and, upon determining the container 7800 is filled to a maximum height within the container, the controller is configured to instruct the movable surface to transit the container to a closure station for sealing prior to return shipping to a customer. In implementations, the movable surface comprises at least one of a conveyor belt, passive rollers paired with driven pusher chains, and driven rollers in operable communication with the drive motor.

The method further comprises based on an analysis of the maximum height variation being larger than the threshold range, iteratively, instructing the at least one actuator to at least one of shake, tilt, rock back and forth, vibrate, shushle and spin the container, optionally instructing the at least one plunger disposed above the container to compress the plurality of deformable laundry articles, receiving an output signal from the at least one sensor disposed proximate the movable surface, and analyzing the received output signal to determine whether the container fill heights detected along the top surface 7303 of the plurality of deformable laundry articles comprise a maximum height variation within a threshold range.

Alternatively, in implementations, the controller 1005 is configured to at least one of shake, tilt, rock back and forth, vibrate, shushle and spin the container 7800 for a duration of time (e.g., 30 seconds, 1 minute, 2 minutes, 3 minutes) to ensure the plurality of unfolded laundry articles collectively comprise a level top surface 7303.

All of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors or circuitry or collection of circuits, e.g., a module) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips and/or magnetic disks, into a different state.

Although the subject matter contained herein has been described in detail for the purpose of illustration, it is to be understood that such detail is solely for that purpose and that the present disclosure is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

Although the examples and implementations herein are described with regard to flattening and leveling contained, unfolded laundry articles, it is to be understood that the devices, systems, and methods herein could be applied to other contained items needing to be flattened and leveled en masse from a mounded or otherwise unevenly distributed volumetric mass.

Other examples are within the scope and spirit of the description and claims. Additionally, certain functions described above can be implemented using software, hardware, firmware, hardwiring, or combinations of any of these. Features implementing functions can also be physically located at various positions, including being distributed such that portions of functions are implemented at different physical locations.

What is claimed is:

1. An autonomously operating system for packing unfolded laundry articles, comprising:
    a container configured to receive a plurality of unfolded laundry articles;
    a movable surface configured to receive the container thereon, the movable surface comprising at least one of a driven conveyor, driven pusher, and driven rollers;
    at least one drive motor configured to impart motion to the received plurality of unfolded laundry articles disposed in the container, the at least one drive motor being configured rotate the at least one of the driven conveyor, driven pusher, and driven rollers;
    at least one sensor configured to detect two or more container fill heights within the container; and
    a controller in operable communication with the at least one drive motor and the at least one sensor, the controller being configured to instruct the at least one drive motor to rotate the at least one of the driven conveyor, driven pusher, and driven rollers and the container disposed thereon rapidly back and forth repeatedly until a maximum height variation in the two or more container fill heights falls within a threshold range, as detected by the at least one sensor.

2. The system of claim 1, wherein the controller is further configured to:
    receive an output signal from the at least one sensor indicative of the two or more container fill heights along a top surface of the plurality of unfolded laundry articles,
    analyze the received output signal to determine whether the two or more container fill heights detected along the top surface of the plurality of unfolded laundry articles comprise the maximum height variation within the threshold range, and
    based on an analysis indicative of the maximum height variation being within the threshold range, instruct the at least one drive motor of the movable surface to transit the container to a packing station for receiving one or more folded laundry articles atop the plurality of unfolded laundry articles.

3. The system of claim 1, wherein the container receives the plurality of unfolded laundry articles from an overhead bin tipper and funnel.

4. The system of claim 3, further comprising a conveyor configured to transit a bin containing the plurality of unfolded laundry articles from an autonomous washing and drying machine to the bin tipper.

5. The system of claim 1, wherein the plurality of unfolded laundry articles each measure no more than 15 cm in a shortest dimension.

6. The system of claim 4, wherein the plurality of unfolded laundry articles each weigh no more than 0.25 kg.

7. The system of claim 1, wherein the unfolded laundry articles comprise articles identified by a separating and sorting robot as being at least one of small and comprising a detected characteristic including at least one of stiffness, lacking symmetry, and being of an identified type of article not requiring folding comprising at least one of undergarments, socks, gloves, hats, swimwear, and baby clothes.

8. The system of claim 1, wherein the threshold range comprises between about 0 cm to 10 cm.

9. The system of claim 1, further comprising selectively extended and retracted barriers on either end of the movable surface, the barriers providing a hard stop for the container moving back and forth on the movable surface, wherein an actuator of the barriers is in operative communication with the controller.

10. The system of claim 1, wherein the at least one drive motor is configured for at least one of rotating, spinning, tilting, shaking, vibrating, oscillating, and shushling of the movable surface.

11. The system of claim 1, wherein the at least one drive motor further comprises at least one of a motor driven cam and follower configured to raise and lower one end of the container, a rotational motor configured to spin the movable surface about a vertical axis, an oscillation motor configured to oscillate the movable surface, a shake table configure to shake the container, and a vibrational motor configured to vibrate the movable surface.

12. The system of claim 11, wherein two or more of the at least one drive motor are synchronously actuated for shushling the container.

13. The system of claim 1, wherein the at least one sensor comprises at least one of a 3-D camera, an IR sensor, a 2-D camera, LIDAR, LADAR, a sonar proximity sensor, an ultrasonic ranging sensor, a radar sensor, a laser measuring device, and a pair of stereo depth cameras.

* * * * *